(12) United States Patent
Klausner et al.

(10) Patent No.: US 12,107,369 B2
(45) Date of Patent: Oct. 1, 2024

(54) SUBSURFACE CONTACT SYSTEM

(71) Applicant: Fraunhofer-Gesellschaft zur Förderung der angewandten Forschung e.V., Munich (DE)

(72) Inventors: Sven Klausner, Dresden (DE); Tim Vorwerk, Dresden (DE); Christian Seiler, Dresden (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 0 days.

(21) Appl. No.: 17/932,958

(22) Filed: Sep. 16, 2022

(65) Prior Publication Data

US 2023/0008114 A1    Jan. 12, 2023

Related U.S. Application Data

(63) Continuation of application No. 16/493,604, filed as application No. PCT/EP2018/056911 on Mar. 19, 2018, now Pat. No. 11,502,456.

(30) Foreign Application Priority Data

Mar. 20, 2017 (DE) ..................... 10 2017 204 608.2
Oct. 12, 2017 (DE) ..................... 10 2017 218 226.1

(51) Int. Cl.
*H01R 13/631* (2006.01)
*B60L 50/50* (2019.01)
(Continued)

(52) U.S. Cl.
CPC .......... *H01R 13/6315* (2013.01); *B60L 50/50* (2019.02); *B60L 53/14* (2019.02);
(Continued)

(58) Field of Classification Search
CPC ................................ B60L 53/16; B60L 53/36
See application file for complete search history.

(56) References Cited

U.S. PATENT DOCUMENTS 11,502,456 B2    11/2022  Klausner et al.
2009/0079270 A1   3/2009  Jin
(Continued)

FOREIGN PATENT DOCUMENTS

CA    2918922 A1 *  2/2015  ............ B60L 11/185
CN   105128686 A    12/2015
(Continued)

OTHER PUBLICATIONS

Machine translation of JP-2005255144-A (Year: 2022).*
(Continued)

*Primary Examiner* — David V Henze-Gongola
(74) *Attorney, Agent, or Firm* — Schwegman Lundberg & Woessner, P.A.

(57) ABSTRACT

The invention relates to a charging contact unit for a vehicle, for integrating beneath a road surface, with a charging contact element carrier head designed to interact with a contact device on the lower side of a vehicle, the contact making and the contact separation being carried out by a relative movement of the charging contact element carrier head and the contact device in a contacting direction, the charging contact element carrier head being movable inside the charging contact unit and/or rotatable or pivotable about the contacting direction in order to compare incorrect positioning in either one or a plurality of directions extending transversely to the contacting direction. The invention also relates to a contact system and a road covering.

19 Claims, 26 Drawing Sheets

(51) Int. Cl.
  *B60L 53/14* (2019.01)
  *B60L 53/16* (2019.01)
  *B60L 53/30* (2019.01)
  *B60L 53/36* (2019.01)

(52) U.S. Cl.
  CPC .............. *B60L 53/16* (2019.02); *B60L 53/30* (2019.02); *B60L 53/36* (2019.02)

(56) References Cited

U.S. PATENT DOCUMENTS

| | | |
|---|---|---|
| 2010/0235006 A1 | 9/2010 | Brown |
| 2011/0066515 A1 | 3/2011 | Horvath et al. |
| 2011/0133692 A1 | 6/2011 | Shimoyama |
| 2011/0148346 A1* | 6/2011 | Gagosz .................. B60L 50/20 320/135 |
| 2013/0193923 A1 | 8/2013 | Kimura et al. |
| 2014/0217977 A1* | 8/2014 | Pastoor .................. B60L 53/35 320/109 |
| 2014/0232338 A1* | 8/2014 | Fontana .................. B60L 53/30 320/109 |
| 2015/0041273 A1* | 2/2015 | Klein ...................... B60L 53/32 191/48 |
| 2015/0306974 A1 | 10/2015 | Mardall et al. |
| 2016/0185239 A1* | 6/2016 | Weigel ................. H01R 13/629 320/109 |
| 2016/0193932 A1 | 7/2016 | Vaghefinazari |
| 2020/0101856 A1 | 4/2020 | Klausner et al. |

FOREIGN PATENT DOCUMENTS

| | | | |
|---|---|---|---|
| DE | 2330255 A1 | 1/1975 | |
| DE | 69711963 | 11/2002 | |
| DE | 102011077427 A1 | 12/2012 | |
| DE | 102011082092 A1 | 3/2013 | |
| DE | 102014226357 | 6/2016 | |
| EP | 2379365 A2 | 10/2011 | |
| EP | 2841296 A1 | 3/2015 | |
| GB | 2185866 | 7/1987 | |
| JP | 2005255144 A * | 9/2005 | .......... B60L 11/1827 |
| JP | 2006081310 A | 3/2006 | |
| JP | 2012212336 | 11/2012 | |
| JP | 2015186310 A | 10/2015 | |
| JP | 2016534694 | 11/2016 | |
| WO | WO-2012053221 A1 | 4/2012 | |
| WO | 2015018887 | 2/2015 | |
| WO | 2015018888 | 2/2015 | |
| WO | WO-2015112355 A1 | 7/2015 | |

OTHER PUBLICATIONS

"Japanese Application Serial No. 2019-551543, Office Action dated Aug. 23, 2022", w English Translation, (dated Aug. 23, 2022), 8 pgs.

"Chinese Application Serial No. 201880020049.X, Office Action dated Sep. 9, 2022", w English Translation, (dated Sep. 9, 2022), 19 pgs.

"U.S. Appl. No. 16/493,604, Corrected Notice of Allowability dated Oct. 14, 2022", 3 pgs.

"U.S. Appl. No. 16/493,604 Supplemental Preliminary Amendment filed Apr. 28, 2022", 7 pgs.

"U.S. Appl. No. 16/493,604, 312 Amendment filed Mar. 31, 2022", 6 pgs.

"U.S. Appl. No. 16/493,604, Advisory Action dated Dec. 13, 2021", 4 pgs.

"U.S. Appl. No. 16/493,604, Corrected Notice of Allowability dated Apr. 27, 2022", 2 pgs.

"U.S. Appl. No. 16/493,604, Final Office Action dated Sep. 7, 2021", 22 pgs.

"U.S. Appl. No. 16/493,604, Non Final Office Action dated Apr. 1, 2021", 18 pgs.

"U.S. Appl. No. 16/493,604, Notice of Allowance dated Jan. 31, 2022", 9 pgs.

"U.S. Appl. No. 16/493,604, Notice of Allowance dated Jun. 23, 2022", 10 pgs.

"U.S. Appl. No. 16/493,604, Preliminary Amendment filed Sep. 12, 2019", 8 pgs.

"U.S. Appl. No. 16/493,604, PTO Response to Rule 312 Communication dated Apr. 15, 2022", 2 pgs.

"U.S. Appl. No. 16/493,604, Response filed Jul. 1, 2021 to Non Final Office Action dated Apr. 1, 2021", 12 pgs.

"U.S. Appl. No. 16/493,604, Response filed Nov. 8, 2021 to Final Office Action dated Sep. 7, 2021", 16 pgs.

"German Application Serial No. 10 2017 218 226.1, Examination Report dated Mar. 5, 2018", (dated Mar. 5, 2018), 8 pgs.

"International Application No. PCT/EP2018/056911, International Search Report dated Jun. 1, 2018", w/ English Translation, (dated Jun. 1, 2018), 7 pgs.

"International Application No. PCT/EP2018/056911, Written Opinion dated Jun. 1, 2018", (dated Jun. 1, 2018), 12 pgs.

"Japanese Application Serial No. 2019-551543, Office Action dated Feb. 15, 2022", 14 pgs.

"Machine translation of CN-105128686-A".

"Machine translation of DE-2330255-A1".

"Machine translation of JP-2005255144-A".

"European Application Serial No. 22 185 555.4, European Search Report dated Oct. 20, 2022", (dated Oct. 20, 2022), 11 pgs.

"Chinese Application Serial No. 201880020049.X, Office Action dated Mar. 30, 2023", w English Translation, (dated Mar. 30, 2023), 19 pgs.

"Japanese Application Serial No. 2023-048005, Office Action dated Oct. 24, 2023", w English Translation, (dated Oct. 24, 2023), 13 pgs.

"Japanese Application No. 2023-048005, Office Action dated Jun. 25, 2024", w/ English Translation, (Jun. 25, 2024), 11 pgs.

\* cited by examiner

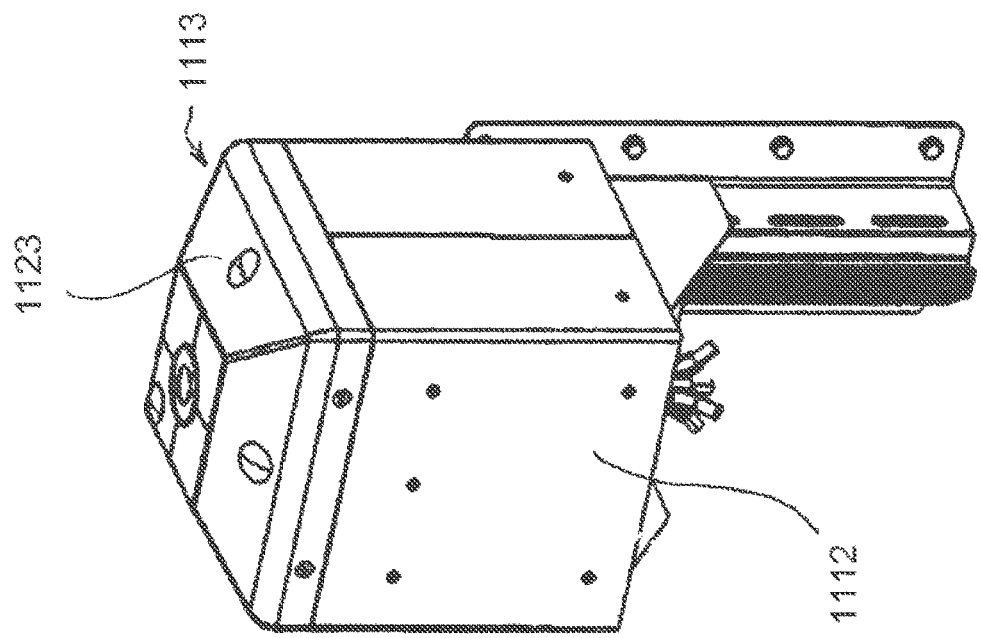
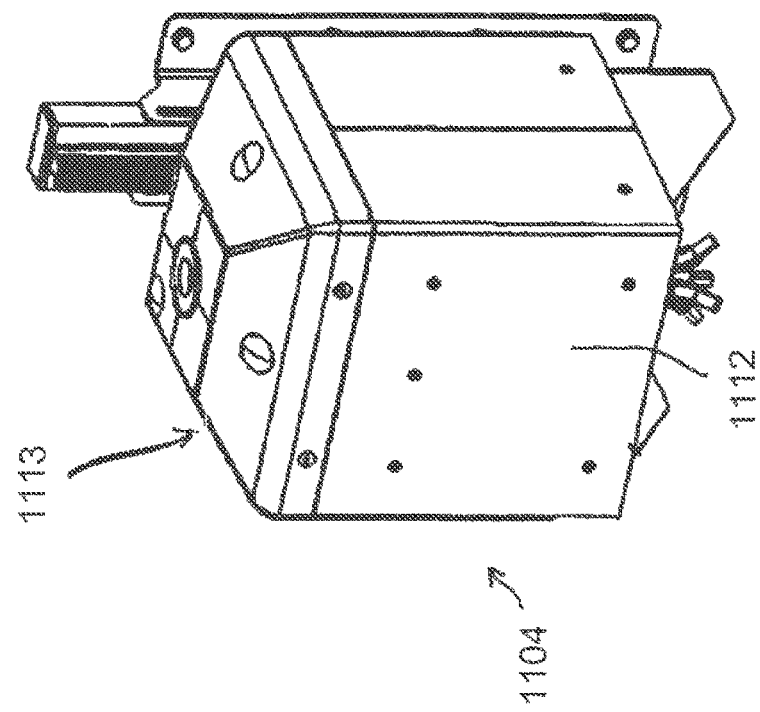
Fig. 24

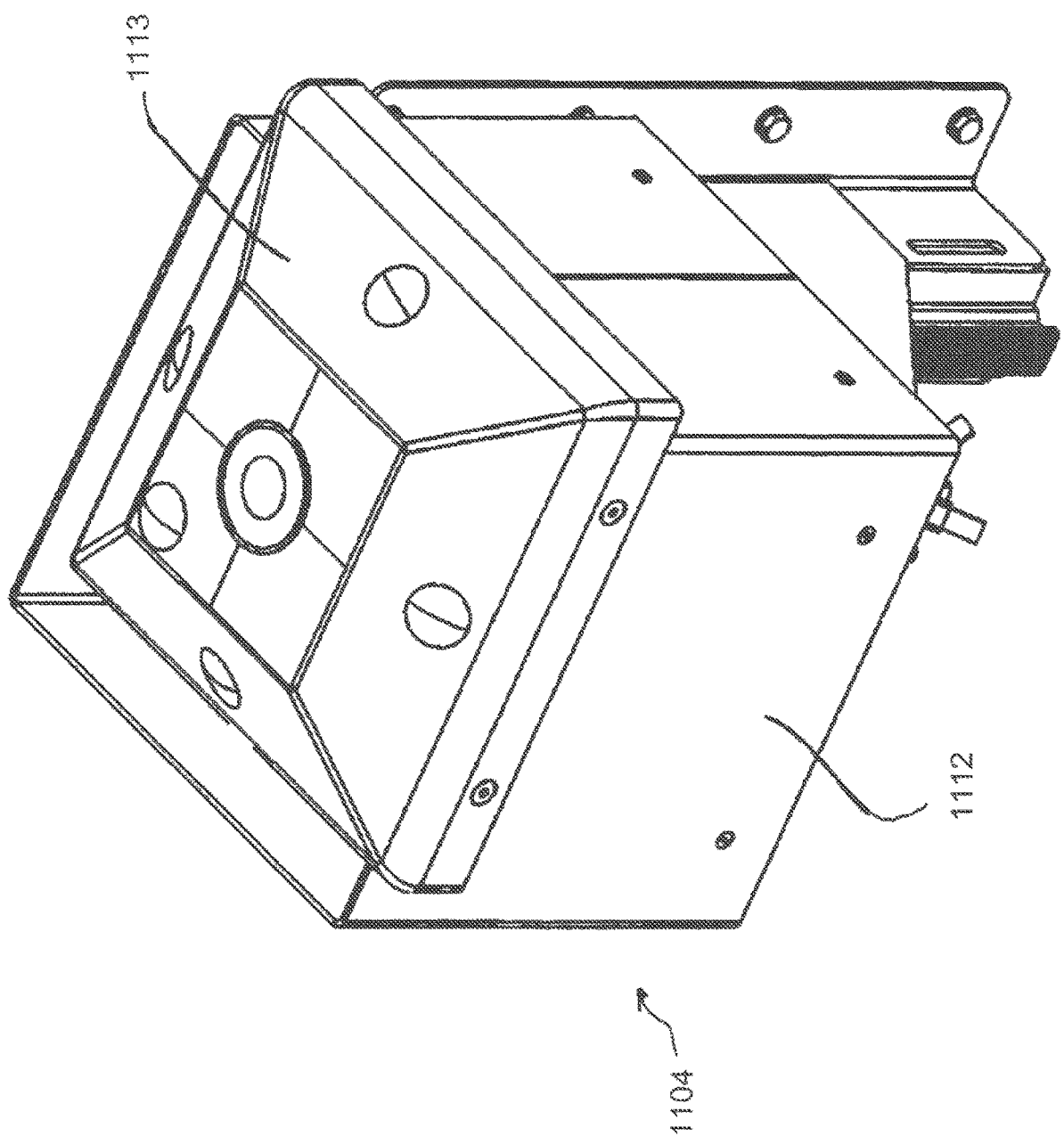

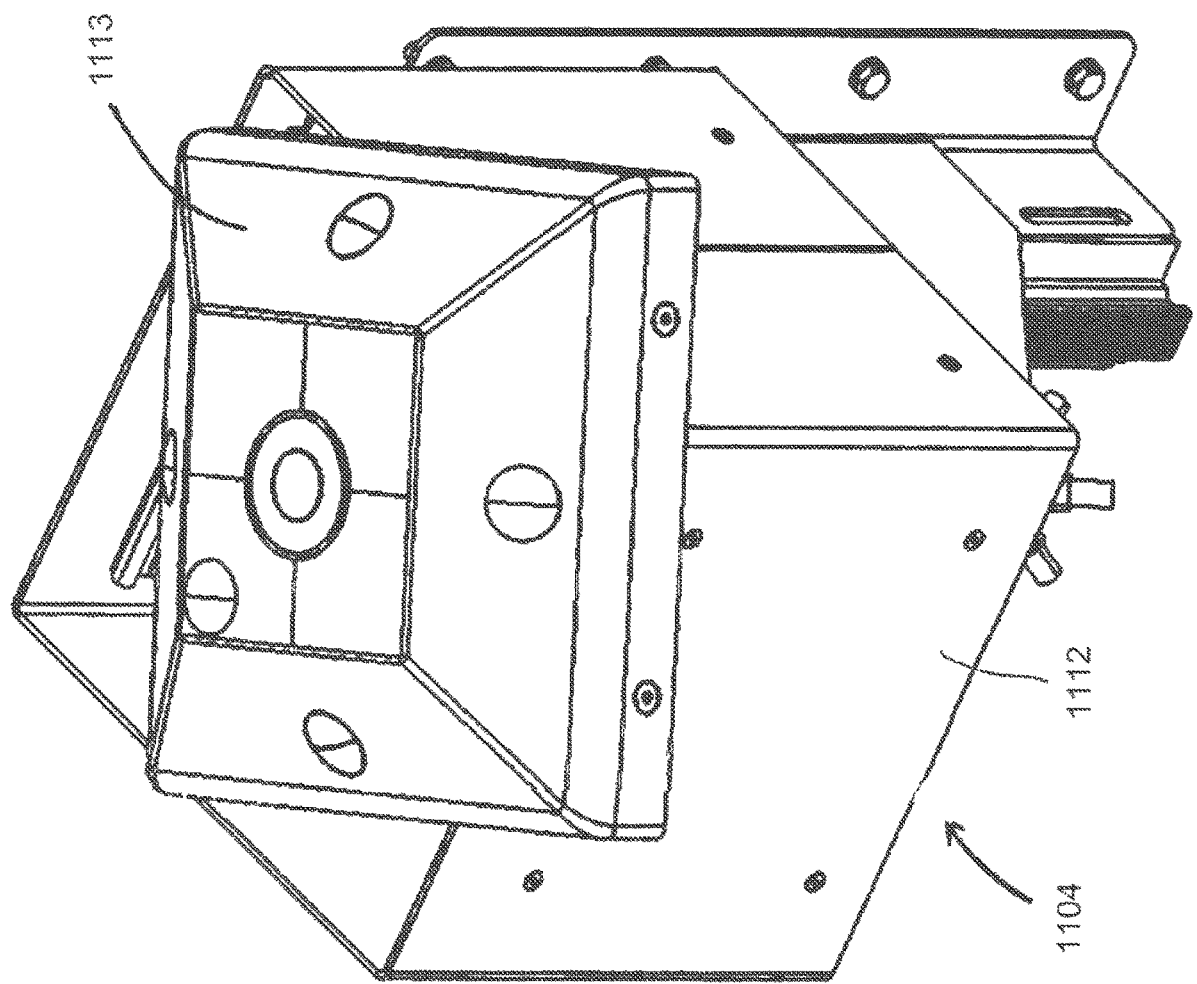

SUBSURFACE CONTACT SYSTEM

PRIORITY APPLICATIONS

This application is a continuation of and claims the benefit of priority of U.S. application Ser. No. 16/493,604, filed Sep. 12, 2019, which is a U.S. National Stage Filing under 35 U.S.C. 371 from International Application No. PCT/EP2018/056911, filed on Mar. 19, 2018, and published as WO2018/172294 on Sep. 27, 2018, which claims the benefit of priority to German Application No. 10 2017 218 226.1, filed on Oct. 12, 2017 and to German Application No. 10 2017 204 608.2, filed on Mar. 20, 2017; the benefit of priority of each of which is hereby claimed herein, and which applications and publication are hereby incorporated herein by reference in their entireties.

The invention lies in the field of mechanical engineering and can be used particularly advantageously in the field of automotive technology.

In recent years, great advances have been made in the development above all of lithium-based battery technology with regard to an increase in the energy density (battery cells with sufficiently high energy density, solution to the "range problem") and system integration. For progressive applications, battery cells having a sufficiently high energy density are thus now available, and on that basis reliable and safe battery systems are also available. Against this background, the rapidly rising number of commercially available vehicles operated electrically purely by battery for inner-city and suburban delivery vehicles as well as private vehicles is a logical consequence.

A necessary condition for the implementation of electric battery-based drive concepts is the availability of sufficiently large time intervals for charging or recharging of the battery store by utilization of standstill times (breaks) caused as a result of operation or use. Due to the brevity of these time intervals, the only possibility to exploit further application scenarios lies in the development of the rapid-charging capability of the battery store and the associated charging infrastructure.

The anticipated developments with regard to increased power densities of battery storage systems have already led to rising charging rates. The charging rate (xC) is a measure for the ratio of the maximum possible charging current (in A) in relation to the nominal capacity (in Ah). Since the battery system voltage has to be provided necessarily by the charging system for the charging process, the charging rate is a direct expression of how quickly the battery store can be charged. With the technical limitation that the battery store cannot be acted on by the maximum charging current in the store charging states of deep discharge and charging end voltage, the statement made above is true at least over a very wide range of the overall capacity. Battery storage systems having charging rates of 5C are already currently commercially available as prior art, which means that they can be acted on by charging currents with which the majority of their overall capacity can be stored within 12 minutes.

On the assumption derived from the prior art that battery stores of sufficient power density are available, the technical qualification of the power electronics involved in the energy transmission might constitute a further obstacle for providing rapid-charging technology with the required technical parameters.

Currently, two physical basic principles for implementing automated systems for the charging of battery vehicles are being discussed and technically implemented: inductive, that is to say wireless, energy transmission, and conductive, that is to say contact-based energy transmission, to which the invention described here makes reference.

Document US 2015/0306974 A1 discloses a charging device for electrically operated vehicles, in which an electrical connector is docked from a subsurface system onto a vehicle, wherein at the same time a connection for thermally stabilizing the vehicle during the charging process is produced.

Document DE 697 11 963 T2 discloses an inductive charging system for electric vehicles with an inductive charging head that can be docked on the vehicle.

US 2009/0079270 A1 discloses an inductive charging system with position determination of the inductive coupling elements relative to one another.

JP 2015-186310 A discloses an inductive subsurface charging system for vehicles.

DE 10 2011 082 092 A1 discloses a guiding device for a charging plug in a charging device for vehicles.

JP 2006-081310 A shows an electrical feed apparatus having contacts which are displaceable and pivotable relative to a plug-in direction.

US 2010/0235006 A1 teaches a charging device for vehicles with a positioning device.

WO 2015/112355 A1 shows a mechanical guiding and centering device for an electric plug which is connected to a charging cable.

DE 10 2011 077 427 A1 describes an inductive charging device having a floatingly mounted charging head.

Against the background of the prior art, the object of the invention is to create a device that enables conductive (contact-based) energy transfer from a charging station to a vehicle and to an energy store situated in the vehicle with high charging current. Here, a contact system should function automatically to the greatest possible extent, moreover without manual intervention.

The invention relates to a charging contact unit for a vehicle with at least one energy store that is to be electrically charged for integration beneath a road surface, with a charging contact element carrier head designed to interact with a contact apparatus on the lower side of a vehicle, the contact making and the contact separation being carried out by a relative movement of the charging contact element carrier head and the contact apparatus in a contacting direction, wherein the charging contact element carrier head is displaceable inside the charging contact unit and/or is rotatable or pivotable about the contacting direction in order to compensate for incorrect positioning in either one direction or a plurality of directions extending transversely to the contacting direction.

The charging contact unit is understood here to mean the roadside unit, i.e. the fixedly installed unit of the charging device, which is approached by a vehicle that is to be charged so as to produce an electrically conductive contact for transporting the charging current. The charging contact unit is usually integrated in a shaft beneath the roadway surface and is connected to a power source, for example an electrical supply network.

The contact with electrical lines in the vehicle is established by charging contact elements, which enter into electrically conductive connection to contact elements of the vehicle-side contact apparatus. This electrically conductive connection can be established as plug-in or clamping contact, however it is preferably assumed within the scope of the present invention that it is also possible to produce contact by means of a pressure contact. To this end, a sufficient contact pressure is established between the contact elements.

Apart from the contact elements for guiding the charging current, further contact elements can usually also be provided in order to satisfy the legal requirements in respect of the formation of contact pairs for charging a vehicle energy store, for example a protective earth and one or more control contacts. A certain order when making contact and when disconnecting the contacts can be specified by suitable arrangement of the contact elements.

One advantage of the present invention lies in the fact that essential parts of the system that move and that are to be driven in order to produce charging contact in the charging contact unit are provided and fixedly installed at the roadside, such that corresponding contact apparatuses on the vehicle side can be kept as simple as possible. For example, a charging contact element carrier head can be moved by means of a drive in the charging contact unit towards a contact apparatus of a vehicle, so as to bring the contact elements of the charging contact unit on the one hand and of the contact apparatus of the vehicle on the other hand into contact. There is then no need to provide, on the vehicle, a drive for parts of the contact apparatus.

With the charging contact element carrier head, an element for heat exchange can be connected, which, during the course of contacting the charging contact element carrier head with the contact apparatus of a motor vehicle, interacts with a vehicle-side heat exchange element in order to enable an exchange of heat. Such an element can be formed as a line for a heat exchange fluid with a corresponding connection port or as a heat conducting element in the form of a body that can absorb and in particular dissipate heat without moving a carrier medium.

However, it is advantageous to compensate for incorrect positioning, since an exact positioning of the contact apparatus of the vehicle relative to the charging contact unit usually is not achieved. This is achieved in that the charging contact element carrier head is displaceable transversely to the contacting direction and/or is rotatable or pivotable about the contacting direction. A separate drive of the charging contact element carrier head can be provided for the compensation of the incorrect positioning and is connected to a sensor assembly which detects the incorrect positioning, wherein the incorrect positioning is compensated for by way of a control device by means of the drive.

It is also possible, however, to design the charging contact element carrier head and the contact apparatus in such a way that they adjust themselves mutually in the manner of a contact catch apparatus. To this end, one of the parts is formed in at least one cross-sectional direction in such a way that the cross-section tapers towards the other element, whereas the other element is formed with a complementary shape at least in the same cross-sectional direction.

The simplest case here is that one of the elements (the charging contact element carrier head or the contact apparatus) is conical or is provided in the form of a pyramid or a truncated cone/truncated pyramid, whereas the other element has a corresponding hollow cone or a receptacle that is complementary to a truncated pyramid. Such a design would be of a complementary shape and would taper in a number of cross-sectional directions. However, it may also be sufficient if such a design of complementary shape were to be implemented only in one cross-sectional direction. A tapering cross-sectional shape in this context can also mean a dome-shaped design of one of the parts and a hollow dome-shaped design of the other part, in addition to a conical or truncated pyramid design. The effect of this design of complementary shapes lies in the fact that, in the event of an incorrect positioning, one of the parts, either the charge contact element carrier head or the contact apparatus, in the event of a relative movement of the two parts for contact making, is adjusted by sliding along guide surfaces of the other part and is displaced or rotated in a direction perpendicular to the contacting direction, such that an optimized positioning of the parts of the contact elements relative to one another is provided at the time of the contact making.

It can be advantageous here that a displaceability is provided in the sense of a movement in translation perpendicular to the contacting direction in the case of one of the parts—charging contact element carrier head or the contact apparatus—and a rotatability about the contacting direction in the case of the other part. It is thus also avoided, inter alia, that one of the parts has to be both displaceable and rotatable.

However, it can also be provided that both the displaceability and a rotatability are provided in one of the parts, for example in the charging contact element carrier head.

An advantageous embodiment of the invention lies in the fact that the charging contact element carrier head is rotatable or displaceable against an elastic restoring force. Elastic restoring forces can be provided here by elastic elements in the form of springs or elastomer elements which are connected on the one hand to the charging contact element carrier head and on the other hand to a stationary part of the charging contact device.

A further advantageous embodiment of the invention lies in the fact that the charging contact element carrier head is mounted on a charging contact element carrier podium or intermediate podium so as to be displaceable in a first direction, and in that the charging contact element carrier podium or intermediate podium is mounted inside the charging contact unit so as to be displaceable in a second direction. The charging contact element carrier podium or intermediate podium is usually arranged beneath the charging contact element carrier head and in turn can be driven advantageously in the contacting direction. To this end, as described further below, a lifting apparatus of the charging contact unit advantageously is provided within the shaft.

A further advantageous embodiment of the charging contact unit provides that the charging contact element carrier head is mounted on the charging contact element carrier podium or intermediate podium by means of a rotary bearing element, wherein a rotary bearing is arranged between the rotary bearing element and the charging contact element carrier head. The charging contact element carrier head is thus both displaceable and rotatable simultaneously. It is thus no longer necessary for the contact apparatus to be movable in the vehicle, although this may be provided in addition.

It can additionally be provided that one or more inclined surface(s) is/are arranged on the charging contact element carrier head and, during the vertical upward movement of the charging contact element carrier head, deflects/deflect one or more covering elements or covering element carriers of a roadway covering in the horizontal direction, such that it is possible for the charging contact element carrier to be deployed from the roadway surface as far as the point of contact with a contact apparatus.

In this embodiment a roadway covering is provided which in a rest position covers the charging contact unit on the upper side so as to form a continuation of the roadway and in an operating position releases an opening above the charging contact element carrier head. To this end, one or more cover element carriers is/are provided with covering elements which, as the charging contact element carrier head is deployed, can be deflected horizontally and thus can be displaced and release an opening for the charging contact element carrier head.

The roadway covering is usually formed such that it is closed and the rest position, when no vehicle is being charged. The roadway covering them forms a continuation of the roadway in the plane of the roadway and is advantageously also loadable in such a way that it can be driven over by vehicles. The roadway covering in the present case comprises covering elements which are carried by covering element carriers and which are displaceable horizontally into the operating position exclusively by way of a pushing movement of the charging contact carrier element head. The covering elements can also comprise one or more flaps which is/are pivotable into the operating position exclusively by a pushing movement of the charging contact carrier element head. This means that it is possible to dispense with a separate drive of the roadway covering. The design outlay and the susceptibility to faults of the charging contact unit are thus reduced.

Alternatively, it is also conceivable to provide a separate, controlled drive for the covering elements of the roadway covering, which drive can be triggered as soon as a vehicle is located in a required position above the charging contact unit, such that the released opening to the charging contact unit and to the charging contact element carrier head is suitably shielded by the vehicle, so that people who are moving in the area of the vehicle are not at risk.

If the roadway covering is driven exclusively by the moved charging contact element carrier head or other parts of the charging contact unit, which are moved during the course of contact making, it is automatically ensured that the roadway covering is opened only when a vehicle is located above the charging contact unit. A drive of the charging contact element carrier head is usually initiated by a control device, regardless of whether it is ensured by means of a marker and by a sensor device on the vehicle side or charging contact unit side that a vehicle is located in the charging position above the charging contact unit. This can also be supported by providing recesses or elevations, grooves, furrows, ribs or ridges on the roadway surface, which either guide or stop the wheels of a vehicle or signal to the driver of the vehicle that he is driving over them by causing the vehicle to shake. A good initial positioning of the vehicle relative to the charging contact unit can thus be ensured.

In an advantageous embodiment of the invention it can additionally be provided that a lifting apparatus (lifting mechanism) for raising the charging contact element carrier head is provided and is formed in particular electrically, hydraulically or pneumatically. The lifting apparatus/lifting mechanism can drive a toothed rack in the vertical direction, for example by means of a motor and a transmission, with the charging contact element carrier podium being fastened to said toothed rack.

A further advantageous embodiment of the invention can provide that in the operating position a holding apparatus independent of the lifting apparatus is provided on the contact apparatus for holding the charging contact element carrier head, in particular in the form of a magnetic holding apparatus. This holding device can ensure that in the operating position a sufficient contact pressure is provided between the charging contact elements and the contact elements of the contact apparatus in order to minimize the electrical contact resistance. Such a holding apparatus can contain a lock and elastic elements for pressing the electrical contacts together.

However, it can also be provided that the magnetic holding apparatus comprises a magnetic holding piece or an electromagnet on the charging contact element carrier head, which holding piece or electromagnet is designed to interact with a counter piece on the contact apparatus, wherein the magnetic holding piece or the electromagnet is structurally combined in particular with an auxiliary contact, in particular a control contact. The electrical contact is maintained by suitable control of the electromagnet either from the contact apparatus or from the charging contact unit. If the electromagnet is switched off, contact separation can thus be initiated. The control contact can be used in particular to detect fault-free contact making and to deliver signals to a control device for operation of the electromagnet.

For example, it can be provided that the holding forces for producing the electrical connection between the charging contact unit and the contact apparatus are applied exclusively by the magnetic holding apparatus. This can cause the moving parts of the charging contact unit to revert to the rest position when the electromagnet is switched off. It is thus ensured, for example when the charging process is complete, that the charging contact unit reverts into a rest position, even in the event of a fault, without the need for active involvement of the charging contact unit, for example in the event of a failure of the supply network. The charging contact element carrier head may then return into the shaft, and the roadway covering likewise returns to the rest position.

It can also be provided advantageously that an impact-damping apparatus for damping a falling movement of the charging contact element carrier head, and the parts movable therewith into the operating position, is provided. Parts of the charging contact unit can thus be prevented from sustaining damage as they return to a rest position. The impact-damping apparatus can comprise a pneumatic or hydraulic impact damper and an elastic spring element. It is usually arranged beneath the charging contact element carrier head, in particular beneath the charging contact element carrier podium, in the region of the lifting apparatus.

It can additionally be provided that the lifting apparatus is designed in such a way that it enables the downward movement of the charging contact element carrier head, and of the parts movable therewith into the operating position, from the operating position without a drive, wherein the lifting apparatus can be mechanically decoupled in particular from the charging contact element carrier head and the parts movable therewith into the operating position. This can be realized in that the lifting apparatus is not self-locking and/or can be decoupled from the parts that are to be driven.

In addition, it can be provided advantageously that the contact system, in particular the charging contact unit, comprises a sensor device which is designed to detect the position of a contact apparatus of a vehicle relative to the charging contact unit, in particular relative to the charging contact element carrier head.

The contact apparatus of the vehicle or the vehicle itself to this end can carry a marker perceptible by the sensor device, which marker must be situated within a reference region of the charging contact unit in order to release deployment of the charging contact element carrier head. The sensor device can be formed optically, electrically, magnetically, or also in the form of an infrared device.

The sensor device can also be provided on the vehicle, wherein a marker on the charging contact unit then has to be detected by the sensor device. In this case a control device on the vehicle can emit corresponding signals for release to the charging contact unit.

The invention relates not only to a charging contact unit of the above-explained type, but also to a contact system comprising a charging contact unit of the above-described type and a contact apparatus in a vehicle, characterized in that, in the event that the charging contact element carrier head is displaceable inside the charging contact unit in one or more directions running transverse to the contacting direction, the contact apparatus is rotatable or pivotable about the contacting direction, and in that, in the event that the charging contact carrier element head is rotatable or pivotable about the contacting direction, the contact apparatus is displaceable relative to the vehicle in one or more directions running transverse to the contacting direction.

It can also be provided, however, that the charging contact element carrier head is displaceable and also rotatable in one or more directions inside the charging contact unit. The contact apparatus can be fixed here and neither displaceable nor rotatable, or also can be displaceable and/or rotatable.

In addition, it can be provided advantageously that the contact apparatus is rotatable or displaceable against an elastic restoring force.

As explained above, it can be provided in addition that the contact apparatus comprises a sensor device which is designed to detect the position of a charging unit, in particular a charging contact element carrier head, relative to the contact apparatus.

The invention also relates to a roadway covering for a contact system with a charging contact unit, which comprises a vertically drivable charging contact element carrier head, in particular a charging contact unit according to the above description, and a vehicle-side contact apparatus for electrically driven vehicles which are each provided with at least one energy store that is to be charged electrically, wherein the roadway covering is arranged in an indentation beneath the upper edge of the roadway, wherein the roadway covering is connected to a shaft element by a connection frame, wherein the roadway covering comprises one or more covering elements which is/are movably mounted reversibly on the connection frame against elastic restoring forces, wherein the covering elements are arranged relative to a charging contact element of the charging contact unit such that the charging contact element carrier head, during its vertical upward movement, deflects one or more covering elements from a closed position, and therefore it is possible for the charging contact element carrier to be deployed from the roadway surface as far as the point of contact with a contact apparatus. The covering elements can be deflected here directly by the charging contact element carrier head, or covering element carriers can also be deflected by the charging contact element carrier head, whereby the covering elements are also removed.

For the deployment of the charging contact element carrier head with charging contact elements towards an opposite, vehicle-side contact apparatus, only the driver of the charging contact element carrier head is thus necessary, and the opening of the covering elements is provided automatically, without an independent drive having to be provided for this purpose.

It can additionally be provided in particular that the roadway covering comprises one or more covering element carriers which are displaceably mounted reversibly on the connection frame against elastic restoring forces, wherein the covering element carriers carry covering elements and are arranged relative to a charging contact element carrier head of the charging contact unit such that one or more inclined surface(s) arranged on the charging contact element carrier head, during the vertical upward movement of the charging contact element carrier head, deflects/deflect one or more covering element carriers in the horizontal direction, and thus it is possible for the charging contact element carrier to be deployed from the roadway surface as far as the point of contact with a contact apparatus.

The covering element carriers and the covering elements are advantageously displaceable in translation horizontally, parallel to the roadway surface. They are guided in their movement within a connection frame, for example in one or more rails. As the charging contact element carrier head is retracted, the covering element carriers are automatically moved by elastic elements (spring elements) back into the closed position, in which the covering elements close the opening in the roadway covering. The covering elements are fixedly connected to the covering element carriers by means of elastic elements which permit a limited relative movement of covering elements and covering element carriers.

In addition, it can be provided in one implementation that at least one sliding or rolling element is arranged on one or each of a number of covering element carriers and, during the course of the vertical upward movement of the charging contact element carrier head, rolls or slides over an inclined surface arranged on the charging contact element carrier head and is thus driven in the horizontal direction jointly with the corresponding covering element carrier.

A further possible embodiment can provide that a plurality of sliding or rolling elements are arranged in succession on one or each of a plurality of covering element carriers in such a way that said elements, during the course of the vertical upward movement of the charging contact element carrier head, roll or slide simultaneously or successively over an inclined surface arranged on the charging contact element carrier head.

It can additionally be provided that the covering elements are connected to the covering element carriers in an elastically movable manner in such a way that the covering elements, when traveled over, can be pressed downwardly into the connection frame in the vertical direction by the weight of a motor vehicle, wherein the connection frame forms a stop for limiting the movement of the covering elements in the vertical direction. As a result of this embodiment, the major forces when the roadway covering is driven over, following an initially joint vertical movement of covering elements and covering element carriers, are supported by the mechanical stop against which the covering elements bears inside the connection frame.

Advantages of the various embodiments of the invention lie, inter alia, in the fact that

- only one individual actuator is required for contact making and activation of the roadway covering,
- contact making and compensation of the positioning tolerances is achieved by a purely vertical movement of the actuator,
- the positioning tolerances are compensated for by a form-fitting connection between contact apparatus and the charging contact unit side, which is displaceable reversibly in one spatial direction and/or is rotatable reversibly about an axis of rotation through a large angle (up to approximately 90 degrees), and also a lifting mechanism, which has a combined reversible transverse and longitudinal movability in a second spatial direction orthogonal to the first spatial direction (contacting direction),
- the necessary holding and contact force during the charging process is applied by activation of an electromagnet (frictional engagement), whereby the actuator can be switched off and the system has maximum freedom of movement in the direction of the force of gravity; the current supplied to the actuator is switched off here following evaluation of a current increase at the time of the contact closure, locking, which can be switched on and off, of the contact closure during the charging process (electromagnetic effect) is made possible, the vehicle that is to be charged can approach with correct polarity from two movement directions of a first spatial direction, an approach from a second spatial direction orthogonal to the first spatial direction by appropriate arrangement of the contact elements and charging contact elements to form the protective earth connection (PE) cannot lead to a target current release (prevention of a short circuit in the case of approach with incorrect polarity), the contact elements and charging contact elements contacted with one another in the sense of current legal provisions in the field of electrical safety (ECE R100) are protected against direct touching (test finger) without the need for an additional barrier element, to return the system to the initial position (safe plant condition), there is no need for any drive energy (current supply to the electromagnet is terminated, return implemented by gravity), the charging contact unit, in the event of return to its safe plant condition, is guided back automatically into its starting position (centering via flap mechanism), the contact apparatus can comprise protection against ambient influences, in particular dirt, in the form for example of a flap system which can be embodied with or without separate function actuator (electrical, pneumatic, hydraulic, magnetic, force of gravity and spring force), the system mass accelerated by gravity in the event of return to the safe plant condition is damped by a hydraulic impact damper or by an impact damper working in accordance with an alternative operating principle, by way of an electromagnet integrated in the roadway covering for example, the flap mechanism can be secured against unintentional opening, the roadway covering or the contact apparatus can contain a sensor, with the aid of which the authorization and/or the correct position of the vehicle that is to be charged with regard to an observance of the tolerable positioning accuracy can be checked, in the shaft element and apparatus there is provided, for example, a warm-air heating system in order to ensure that the shaft covering and the charging contact unit remain free from snow and ice, heating elements, for example in the form of heating strips, can be provided on the contact apparatus in order to ensure that the contact elements remain free from snow and ice, and in order to increase the transmittable charging current, more than one contact element per formed contact pole, primarily the contact poles for power transmission and for the protective earth (PE), can be contained both in the contact apparatus and in the charging contact unit.

The invention lastly also relates to a charging contact device with a charging contact unit of the above-described type and with a roadway covering of the above-described type, wherein the vertically drivable charging contact element carrier head and the roadway covering are designed in such a way that the charging contact element carrier head, during its vertical upward movement, deflects one or more covering elements of the roadway covering from its/their closed position. Here, the charging contact element carrier head, in one implementation, can exert a force directly onto covering elements in order to move these. This can also be achieved by way of leavers or other transmission elements. By means of the movement of the charging contact element carrier head, a separate drive of covering elements can also be triggered mechanically or electrically. To this end, a mechanical locking of the covering elements by the charging contact element carrier head can also be released, or an electrical switch can be actuated.

The charging contact element carrier head can have one or more guide surfaces, in particular chamfers or inclined surfaces, which provide an active surface of the roadway covering, in particular of the covering elements, in order to push open the covering elements and which additionally are designed as guide surfaces for orientation relative to a contact apparatus on a vehicle.

The invention will be shown hereinafter and then explained with reference to figures of a drawing. In the drawing FIG. 1 schematically shows a vehicle which is located above a charging contact unit, FIG. 2 shows a charging contact unit with a roadway covering and a vehicle-side contact apparatus, FIGS. 3-10 show parts of the charging contact unit in various views and cross-sections, FIGS. 11-13 show the contact apparatus in various views, FIGS. 14 and 15 show parts of the roadway covering in an isometric view, FIGS. 16 and 17 show parts of the roadway covering in a side view, FIGS. 18-21 in a side view show the roadway covering and the lifting apparatus, the charging contact element carrier podium and the charging contact element carrier head at the time of movement through the roadway covering, FIG. 22 shows a perspective illustration of a charging contact device, a roadway covering, and a contact apparatus, FIG. 23 shows a perspective illustration of a roadway covering, FIG. 24 shows a charging contact element carrier in two different vertical positions, FIGS. 25 a and b show a charging contact element carrier with a charging contact element carrier head which is displaced and (in FIG. 25b) rotated relative to a podium, FIGS. 26 and 27 show a charging contact element carrier podium with and without cladding, FIGS. 28 to 31 show an intermediate podium, displaceable in two directions, for a charging contact element carrier head, FIG. 32 shows a roadway covering and a shaft element in a side view, and FIGS. 33 to 35 show a charging contact element carrier in three different vertical positions, in which the covering elements and covering element carriers are deflected to varying extents.

FIG. 1 shows a vehicle 1 in an exemplary manner in a schematic side view, which vehicle is arranged above a charging contact unit 100. This is arranged in a shaft beneath the roadway level 101. The charging contact unit 100 comprises a charging contact element carrier head 113, which will be explained in further detail hereinafter and which can be driven by a lifting mechanism 105 in the contacting direction shown by the arrow 6. The lifting mechanism 105 is controlled here by a control device 5 which processes a release signal from a sensor apparatus 4, 4' which is provided either by the charging contact unit (4)

or by the contact apparatus (4') and which detects the positioning of the vehicle 1 within a reference position region relative to the charging contact unit 100.

If the charging contact element carrier head 113 is now moved in the direction of the arrow 6 towards the contact apparatus 200 until contact is made, electrical contact is thus established, which causes an electrical charging current to flow from a supply network via the charging contact elements to the contact apparatus 200 and to a store of electrical energy 3 in the vehicle 1. The energy storage device 3 can thus be charged, said device supplying energy for example to an electric motor 2 or other electrical systems within the vehicle 1.

The invention relates, amongst other things, as shown in the figures, to a system which, by way of a single, suitable drive, enables a vertical upward movement of a charging contact unit integrated in the ground and, by pushing open, causes a movable roadway covering which can be traveled over by vehicles and is situated above the charging contact unit to open, wherein the roadway covering centers the displaceable charging contact element carrier, which is integrated in the ground, in a central position and minimizes the region between roadway and vehicle underbody during its movement and thus produces a conductive connection for electrical energy transmission with a vehicle-side contact apparatus.

The subsurface contact system from FIG. 2 consists of three sub-systems. These are the charging contact unit 100, contact apparatus 200, and the roadway covering 300. With reference to the accompanying figures, a first preferred embodiment of the subsurface contact system will first be explained.

FIG. 3 shows the charging contact unit in a view beneath the roadway surface 101 in the form of a mechanism integrated in the ground. It consists of a shaft element 102, a carrier element 103 fastened to the shaft element 102, a charging contact element carrier 104, and a lifting mechanism 105, which connects the carrier element 103 and the charging contact element carrier 104 and enables a vertical movement of the charging contact element carrier 104 relative to the carrier element 103.

FIG. 4 shows the lifting mechanism, consisting of carrier element 103, lifting frame 105, gear rack drive 106 with toothed rack 107 and stepper motor 108. The purpose of the lifting mechanism is to raise the charging contact element carrier 104 in order to push open the roadway covering 300 and bridge the air gap between charging contact element carrier 104 and contact apparatus 200. A hydraulic impact damper 110 and an elastic damping element 111 are situated in the lower region of the system.

A comparison of FIGS. 4 to 10 shows the charging contact element carrier 104 in various views. The charging contact element carrier 104 is constructed into parts and consists predominantly of a non-electrically conductive material. It is composed of the charging contact element carrier podium 112 and the charging contact element carrier head 113. The charging contact element carrier head 113 has the form of a truncated pyramid and carries the charging contact elements 121. The charging contact element carrier head 113 is movable linearly about a central position (±x) in the vehicle longitudinal direction horizontally between two end stops 114. As a result of this movability, it is possible to compensate for positioning tolerances of the vehicle in the direction of travel.

The charging contact element carrier head can also be convex in the region of its inclined surfaces, as is denoted by 113' in the variant shown in FIG. 4. Inclined positions of the charging contact element carrier in the form of deviations from the vertical direction in relation to the contact apparatus can thus also be compensated.

The charging contact element carrier 104 is additionally movable about a central position (±y) linearly and horizontally in the vehicle transverse direction on the lifting frame 105 between two delimiting damping elements 115. As a result of this movability, it is possible to compensate for positioning tolerances of the vehicle transverse to the direction of travel. The mounting of the charging contact element carrier podium 112 on the lifting frame 105 is designed such that the charging contact element carrier podium 112 is guided via suitable linear guide elements 116 on compatible linear guide rails 117, which are fastened to the lifting frame 105. The entire charging contact element carrier 104 is oriented in a central position via a spring mechanism 316 in the roadway covering 300.

The charging contact element carrier head 113 is mounted on the charging contact element carrier podium 112 such that the charging contact element carrier had 113 is equipped with linear guide rails 118, which guide compatible linear guide elements 119 fastened to the charging contact element carrier podium 112. The charging contact element carrier head 113 is oriented in a central position on the charging contact element carrier podium 112 by elastic elements 120, in particular made of a non-electrically conductive material.

The elastic elements 120 are connected at the points P to the charging contact element carrier podium 112 and at the points K to the charging contact element carrier head 113. By way of a rotationally symmetrical arrangement of the elastic elements 120, an equilibrium of forces and thus central positioning are ensured. A touch protection means 122 for preventing the charging contact elements 121 from being touched in the contacted state is provided beneath the charging contact element carrier had 113.

The charging contact element carrier head 113 carries the roadside charging contact elements 121 for positive terminal 123 and negative terminal 124, the PE contact (PE) 125, and the control pilot contact (CP) 126. The charging contact element for CP 126 is made of a magnetic material. The charging contact elements for PE 125 are arranged such that the potential contacting positions are limited. It is possible to establish contact from a direction of travel X and the opposite direction, rotated through 180 relative thereto. It is not possible to release the power contacts in the case of a positioning orthogonal to the direction of travel X, since the PE 125 in this case cannot be contacted at any time. It is thus ensured that only associated charging contact elements for the positive terminal 123 and negative terminal 124 and contact elements for the positive terminal 201 and negative terminal 202 for the charging process can be touched.

In order to maintain a defined contact order when making contact and separating contact, the charging contact elements for the positive terminal 123 and negative terminal 124 and for PE 125 are embodied as spring contact elements with different starting height. The charging contact elements for PE 125 have a starting height H1. The charging contact elements for the positive terminal 123 and negative terminal 124 have a starting height H2. The charging contact element for CP 126 has a starting height H3. It is rigid and serves as an end stop for the contacting. The starting heights have the following relationship with one another: H1>H2>H3. The charging contacts for PE 125 are arranged such that, as they slide into the contact apparatus 200, they are not at any time able to touch the contact elements for the positive terminal 123 or negative terminal 124.

Due to the aforesaid movability, the charging contact element carrier head 113 can slide freely at the sliding edge 127 into the contact apparatus 200. The charging contact elements 123, 124, 125, 126 are separated spatially from one another by stiffeners 128 and the charging contact element carrier head 113. It is thus ensured that any dirtying caused by water or brine cannot bring about an electrically conductive connection between the charging contact elements 123, 124, 125, 126.

FIGS. 11 to 13 show the contact apparatus in various views. The contact apparatus 200 denotes the sub-system fastened rigidly (concept according to the invention) or movably to the vehicle underbody. The contact apparatus carries the vehicle-side contact elements for the positive terminal 201 and negative terminal 202, the PE 203, and the CPU 204. The contact elements for the positive terminal 201 and negative terminal 202 and for the PE 203 are rigid plates made of electrically conductive material and fastened to the contact apparatus 200. The contact element for CP 204 (signal/safety/control contact) is an electromagnet.

This is positioned in the contact apparatus 200 such that in the contacted state it is congruent with/complementary to the magnetic counter piece integrated in the charging contact element carrier head 113. The contact apparatus 200 is positioned on the vehicle such that its lowest point with maximum permissible vehicle weight is arranged at the legally prescribed minimum distance from the roadway surface. The contact apparatus 200 is elastically mounted rotatably about its vertical axis, such that it automatically assumes its starting position in the force-free state. To this end, the fastening point to the vehicle is embodied as a ball-joint-like rotatable, elastic bearing 205. Positioning tolerances of the vehicle with regard to the rotation about the vehicle vertical axis can be compensated for by the rotatable, elastic mounting.

The contact apparatus 200 has the form of an inverted truncated pyramid and is congruent with the charging contact element carrier head 113. Due to the form of the inverted truncated pyramid, the charging contact element carrier head 113 can slide via the sliding edge 127 along the contact guide surfaces 206 of the contact apparatus into the contact apparatus.

The charging contact elements for PE 125 and the contact elements for PE 203 can touch one another only if the charging contact element carrier head 113 is oriented such that contact is established from a direction opposite the direction of travel X and rotated 180 relative thereto. If the charging contact element carrier head 90 is oriented towards the contact apparatus, the charging contact elements for PE 125 and the contact elements for PE 203 cannot touch one another. Successful contacting within the sense of current legal provisions for charging battery-powered electric vehicles is therefore not possible, and a transfer of current is ruled out in this case.

The electromagnet provided as contact element CP 204 is only activated during the course of the initialization of the charging process, that is to say when the vehicle is at a standstill. Here, the magnetic connection between the contact element CP 204 and the charging contact element CP 126 is designed such that the contact force necessary for high current transmission is available at all connections between the charging contact elements and the contact elements. It is thus possible to deactivate the stepper motor 108 following successful contacting. The magnetic connection, during the charging process, additionally functions likewise as a means for locking the connection between contact apparatus and charging contact apparatus in order to form a required contact force. In the event of a fault or in the event of controlled termination of the charging process, the magnetic connection between the contact element CP 204 and the charging contact element CP 126 can be ended by deactivating the electromagnet (disconnection of the voltage supply thereto). The system then passes automatically into its starting position beneath the upper edge of the roadway, following the direction of gravity. In so doing, the accelerated mass is braked by a hydraulic impact damper 110 and an elastic damping element 111.

By way of the positioning of the charging contact elements for PE 125 on the charging contact element carrier head 113 and the positioning of the contact elements for the positive terminal 201 and negative terminal 202 on the contact apparatus 200 and on the charging contact element carrier head 113, the contact apparatus 200 and charging contact unit 100 from a system which, based on its properties, has similarities to a plug-and-socket system:
transmission of current possible only in admissible relative positions;
locking of the system during the transmission of current;
compatibility of the sub-systems;
protection against touching (at least observance of the "test finger" guideline of ECE R100) without the need for an additional barrier element.

A comparison of FIGS. 14 to 15 shows the roadway covering 300 in a perspective view and as a mechanism integrated into the roadway surface 101. This comprises a connection frame 301, which is fixedly connected to the shaft element 102 of the charging contact unit 100 and carries four movable flaps arranged symmetrically about a longitudinal axis 302.

These movable flaps are referred to as main flaps 303 and auxiliary flap 304, wherein the main flaps 303 are connected rotatably to the connection frame 301 via a lever structure 305 and the auxiliary flaps 304 are connected rotatably to said connection frame via a hinge structure 306. The inner part of the connection frame 301 is formed as a steel frame 307 and is encased by an outer concrete frame 308. Here, the steel frame 307 is incorporated in the shaft element 102 of the charging contact unit 100 by folding so as to prevent displacement along the longitudinal axis 302 and the transverse axis 309.

A comparison of FIGS. 16 to 17 shows the roadway covering 300 in a front view in the closed and open state, wherein, for opening, the vertical movement of the charge contact element carrier 104 along the vertical axis 310, indicated here by the arrow 311, is utilized in order to rotate the main flaps 303 about a rotary bearing 312 in opposite directions from their rest position, as indicated by the arrows 313. Here, the rolling or sliding elements 314 fastened to both main flaps 303 ensure that the charging contact element carrier 104 can roll or slide along the main flaps 303 with little friction and therefore that the lever structure 305 can open both flaps 303 symmetrically in opposite directions. Initiated by the opening or closing process respectively, the auxiliary flaps 304 slide along the main flaps 303 and are rotated about a rotary bearing 315 with the aid of the hinge structure 306. In the rest position the roadway covering 300 should form a closed roadway surface 101; for this purpose, the main flaps 303 and the auxiliary flaps 304 are preloaded by the spring elements 316 and a spring element 317.

A comparison of FIGS. 18 to 19 shows how the roadway covering 300 compensates for a deviation (±y) of the position of the charging contact element carrier 104 from the vertical axis 310 in that the charging contact element carrier 104 guides the spring-preloaded main flaps 303 during the one-dimensional horizontal movement, brought about by a position deviation of the vehicle in the vehicle transverse direction Y following initial contact between the charging contact element carrier 104 and the contact device 200. The charging contact element carrier is moved at the time of contacting from its central position by the position deviation of the vehicle (in both directions of Y), and the flap mechanism ensures that the charging contact element carrier is guided back into the central position following contact separation and return to the rest position.

A combination of FIGS. 20 to 21 shows that the charging contact element carrier 104 is displaced back into its centered position by the restoring forces of the spring elements 316 from a horizontally disposed position, as shown in the previous FIGS. 18 and 19, so that the charging contact element carrier always assumes a symmetrical position relative to the vertical axis 310 following the closing process of the roadway covering 300.

The invention additionally relates to a further embodiment of the invention shown in FIGS. 22 to 35, in which a vertical upward movement of a charging contact element carrier is made possible likewise by a single, suitable drive in the case of a charging contact unit integrated in the ground, and a movable roadway covering which can be traveled over by vehicles and is situated above the charging contact element carrier can be opened.

The subsurface contact system from FIGS. 22 to 35 also comprises, similarly to the system from FIGS. 1 to 21, the three subsystems consisting of a charging contact unit 1100, contact apparatus 1200, and the roadway covering 1300.

The roadway covering 1300 is shown in FIG. 22 in a perspective view and is formed as a mechanism integrated in the roadway surface. It comprises, as in the embodiments shown in FIGS. 1 to 21, a connection frame 1307, which is fixedly connected to the shaft element of the charging contact unit 1100, and covering elements 1303, 1304, and covering element carriers 1303a, 1304a, which will be described in greater detail further below.

FIG. 23, in its upper region, shows the roadway covering in a perspective depiction with the connection frame 1307 and two covering elements in the form of plates 1303, 1304 linearly displaceable in the connection frame. The covering elements/plates are mechanically guided in such a way that they can slide away from one another horizontally in the connection frame 1307 in the direction of the arrows 1320, 1321. Here, they slide above and at a distance from one or more flat mechanical stops 1322 arranged in the connection frame. If the roadway covering in the closed state is traveled over by a vehicle or is otherwise loaded from above, the covering elements thus sink until they rest on the stop(s).

The weight is in this way absorbed by the connection frame 1307, and the forces acting on the drive mechanism of the covering elements are limited.

The connection frame 1307 is shown again in the lower region of FIG. 23, wherein the covering elements 1303, 1304 have been omitted in order to expose the view of the covering element carriers 1303a, 1304a. These are guided slidingly displaceably in rails 1323 on both sides of the connection frame, whereby the horizontally sliding movability of the covering elements is likewise provided. The covering element 1303, 1304 are mounted on the covering element carriers by means of a floating bearing in the form of elastic holding elements 1324, 1325, for example elastomer blocks. For example, the covering elements and the covering element carriers can be connected independently of one another to the elastomer blocks, in particular can be connected by means of a screw connection. Three rolling elements are shown axially parallel and adjacently to one another on each of the covering element carriers 1303a, 1304a, over which rolling elements a charging contact element carrier head can slide via an inclined surface in order to push the covering element carrier horizontally to the side. One of the rolling elements is denoted in the figure by 1326. The rolling elements will be described in greater detail further below.

The charging contact unit 1100 fundamentally comprises a drive mechanism which corresponds to the mechanism shown in FIG. 5. This consists of a shaft element, a carrier element fastened to the shaft element, a charging contact element carrier and a lifting mechanism which connects the carrier element and the charging contact element carrier 1104 and enables a vertical movement of the charging contact element carrier upwardly towards the roadway surface.

FIGS. 24 and 25 show the charging contact element carrier 1104 in various positions. The charging contact element carrier 1104 comprises the charging contact element carrier podium 1112 and the charging contact element carrier head 1113. The charging contact element carrier head 1113 has the form of a truncated pyramid and carries the charging contact elements 1123 (see FIGS. 9 and 10). The electrical contacts of the charging contact element carrier head 1113 are fundamentally also constructed and designed as shown in FIGS. 9 and 10.

The contact apparatus 1200 can also be constructed similarly to the manner shown in FIGS. 11, 12 and 13. The contact apparatus 1200 fundamentally denotes the subsystem fastened rigidly or movably to the vehicle underbody.

Due to the protection mechanisms described in conjunction with FIGS. 11, 12 and 13, the charging current can be released only once it has been ensured that contact has been made correctly, and it is also ensured that the power contacts cannot be released in the case of a positioning orthogonal to the direction of travel.

The charging contact element carrier podium 1112 and the charging contact element carrier head 1113 are movable jointly in the vertical direction by the lifting mechanism, as shown by the comparison of the left-hand and right-hand depiction of these elements in FIG. 24. The charging contact element carrier head 1113 is linearly movable horizontally about a central position (±x) in two dimensions, for example in the vehicle longitudinal direction and transversely thereto. FIG. 25a shows a position of the charging contact element carrier head 1113 displaced in translation from the central position of the charging contact element carrier podium 1112. As a result of this movability, positioning tolerances of the vehicle in all horizontal directions can be compensated.

FIG. 25b shows a position of the charging contact element carrier head 1113 rotated in relation to the central position about the vertical axis of the charging contact element carrier. As a result of the rotatability, positions of a vehicle or of its contact apparatus rotated from a normal position can be compensated, and the charging contact element carrier head 1113 can be rotated and displaced such that it can adapt to the contact element in the vehicle and can produce reliable contact. This is possible both for the case in which the contact element is itself mounted displaceably and/or rotatably, and for the case in which the contact element is mounted fixedly and non-rotatably and/or non-displaceably in the vehicle.

FIG. 26 shows a charging contact element carrier podium 1112 in which a first intermediate podium 1128 is mounted linearly displaceably on rails.

A rotary bearing 1127 for rotatably mounting a charging contact element carrier head is provided on the intermediate podium 1128.

FIG. 27 shows a depiction of a charging contact element carrier in which part of the cladding of the charging contact element carrier podium has been omitted for the sake of clarity. The first intermediate podium 1127 can be seen, which is mounted on rails which are in turn fastened in a second intermediate podium 1130.

The second intermediate podium 1130 is mounted on rails which are fastened to the frame of the charging contact element carrier podium 1112. Spring elements are additionally shown, the front two of which are denoted by 1120*c* and 1120*d* and are fastened to the first intermediate podium on the one hand and the frame of the charging contact element carrier podium 1112 on the other hand.

The spring elements, in the rest position, ensure the orientation of the overall charging contact element carrier head 1113 in a central and unrotated position.

As shown in FIGS. 28, 29, 30 and 31 with omission of other elements, the charging contact element carrier podium 1112, to which the charging contact element carrier head 1113 is fastened, is formed in such a way that the charging contact element carrier head 1113 sits in a rotary bearing 1127 on a first intermediate podium 1128. The first intermediate podium 1128 is guided linearly movably by means of four guide elements 1129*a*, 1129*b*, 1129*c* and 1129*d* on two guide rails 1131, 1132 of a second intermediate podium 1130.

The second intermediate podium 1130 is in turn guided linearly movably by means of four guide elements 1133*a*, 1133*b*, 1133*c*, 1133*d* on two guide rails 1134, 1135, which are in turn fastened to the charging contact element carrier podium 1112, or more precisely to the frame thereof. The guide rails 1131, 1132 are parallel to one another and preferably run perpendicularly to the guide rails 1134, 1135.

The orientation of the charging contact element carrier head 1113 on the charging contact element carrier podium 1112 in a central position is provided by the four elastic elements 1120*a*, 1120*b*, 1120*c* and 1120*d* tensioned in different directions between the first intermediate podium 1128 and the charging contact element carrier podium 1112, in particular in the form of spring legs made of a non-electrically conductive material or elastomer strands.

By way of an arrangement of the four elastic elements 1120*a*, 1120*b*, 1120*c* and 1120*d*, in particular a rotationally symmetrical arrangement, distributed over four different directions, and equilibrium of forces and thus the central positioning is ensured.

The four FIGS. 28 to 31 show the constellation with the first and second intermediate podium in four different positions, wherein the first intermediate podium 1128 is shifted from the center to the left in FIG. 28, to the right in FIG. 29, downwardly in FIG. 30 and upwardly in FIG. 31.

Due to the positioning of the charging contact elements on the charging contact element carrier head 1113 in the form which is explained in conjunction with FIGS. 9 to 12 and hereinafter and which can also be used in this exemplary embodiment, the contact apparatus 1200 and charging contact unit 1100 form a system which, based on its properties, has the following similarities to a plug-and-socket system:

- transmission of current possible only in admissible relative positions;
- locking of the system during the transmission of current;
- compatibility of the sub-systems;
- protection against touching (at least observance of the "test finger" guideline of ECE R100) without the need for an additional barrier element.

FIG. 32 shows a charging contact unit 1100 with a roadway covering 1300 schematically in a side view. Part of the roadway covering is the connection frame 1307 with a covering plate 1330 mounted fixedly thereon. The covering plate 1330 comprises an opening which is closed by two covering elements 1303, 1304 outside operation. The covering element carriers 1303*a* and 1304*a*, which carry the covering elements 1303 and 1304, are guided in rails in the connection frame 1307, as can be best seen from FIG. 23.

FIGS. 33, 34 and 35 show, in somewhat more detail, a side view of the charging contact element carrier 1104 and part of the roadway covering with the covering element carriers 1303*a*, 1304*a*, and the covering elements 1303, 1304. It can be seen from the figure that the covering elements 1303, 1304 are mounted floatingly on a covering element carrier 1303*a*, 1303*b* each by means of elastic elements 1324, 1325. FIGS. 33, 34 and 35 show the covering element carriers, covering elements, and a charging contact element carrier head in three different positions.

FIG. 33 shows the charging contact element carrier 1104 with the charging contact element carrier head 1113 in a position beneath the covering element carrier 1303*a*, 1304*a* directly at the point at which the inclined surfaces of the charging contact element carrier head 1113, which is in the form of a truncated pyramid, come into contact with the rolling elements, which in this case are formed as sets of three rollers on each covering element carrier. Of the rollers, the uppermost roller of the covering element carrier 1303*a* is denoted by 1326.

Figure 1:
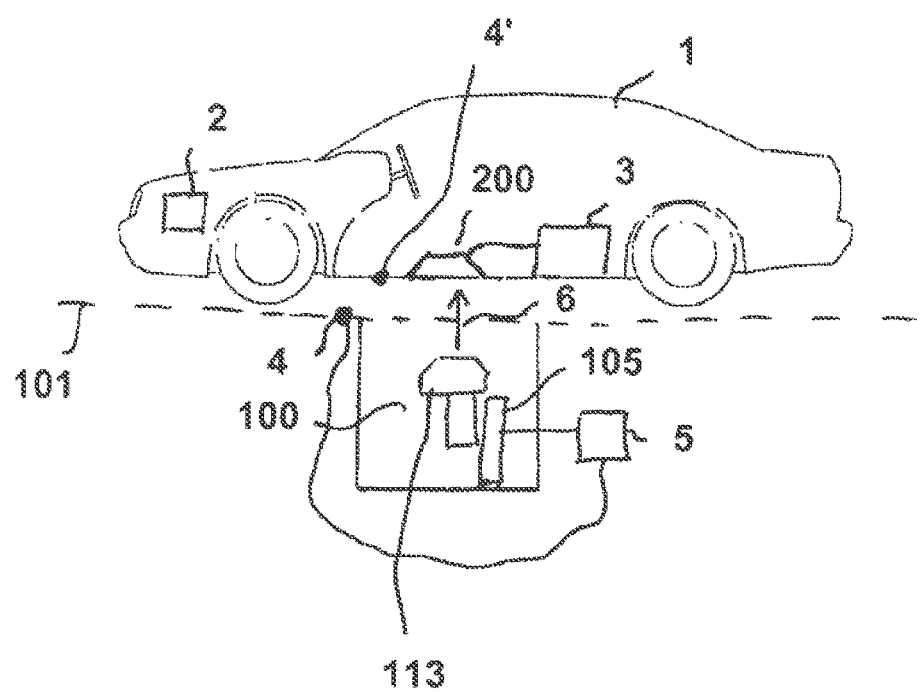
Figure 2:
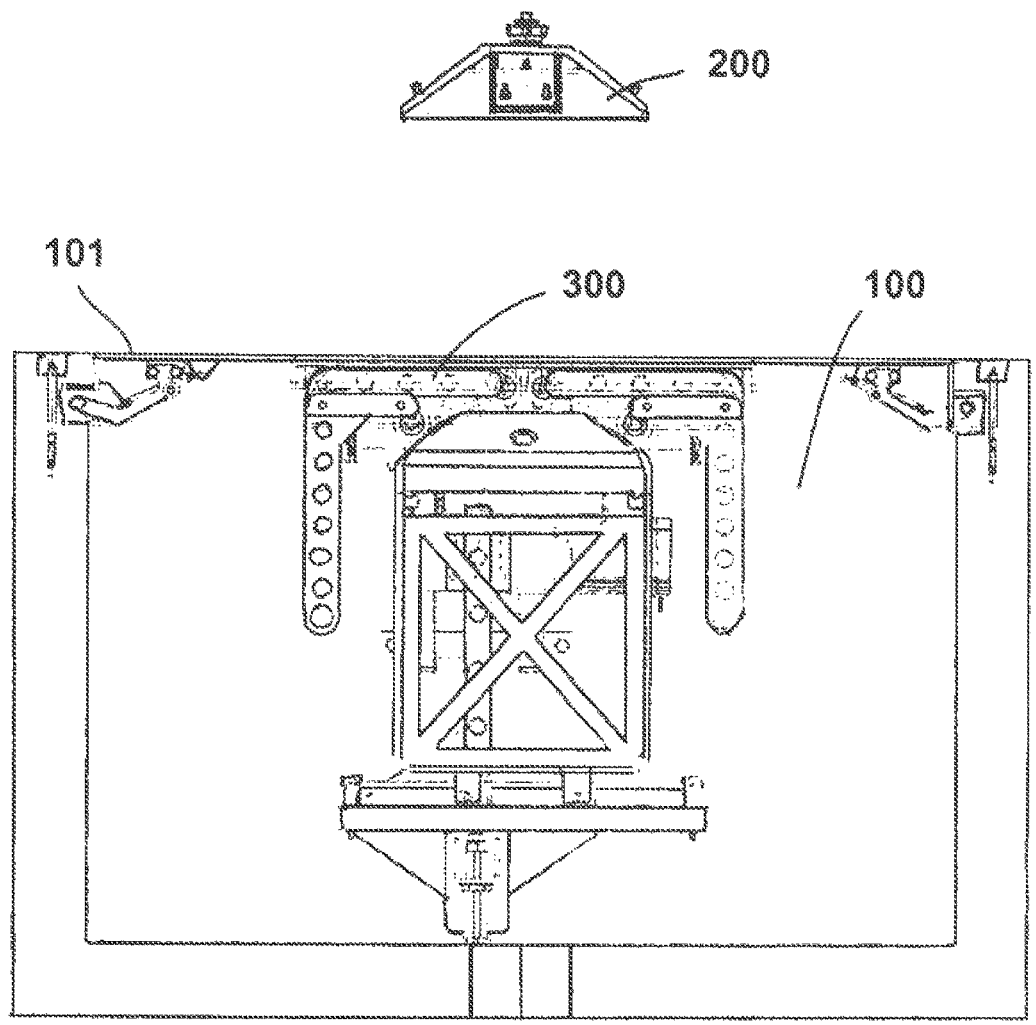
Figure 3:
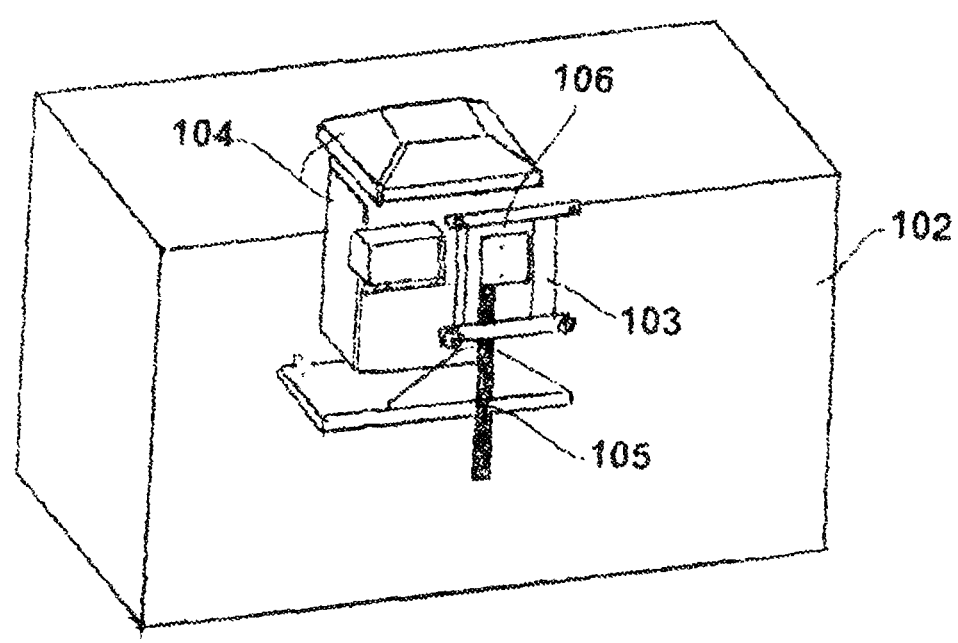
Figure 4:
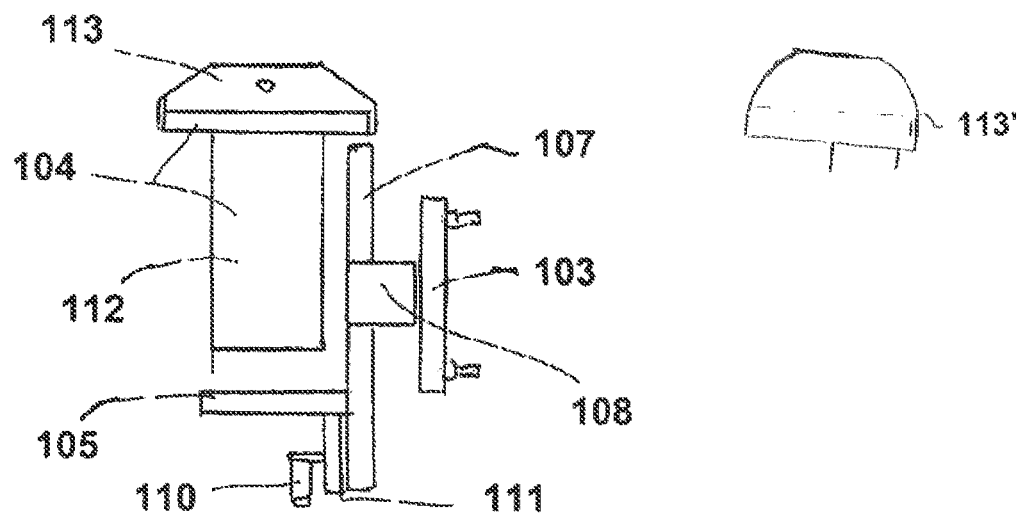
Figure 5:
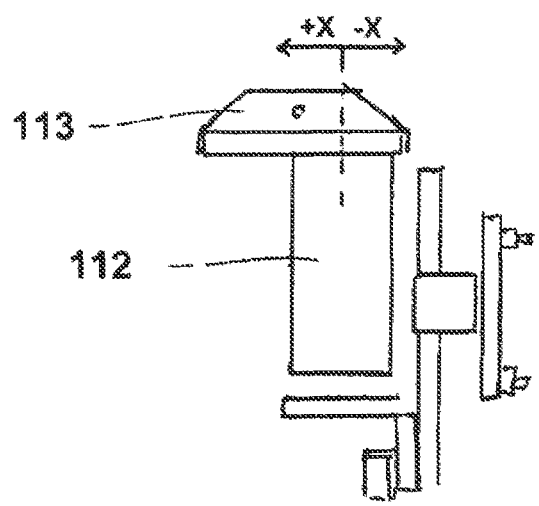
Figure 6:
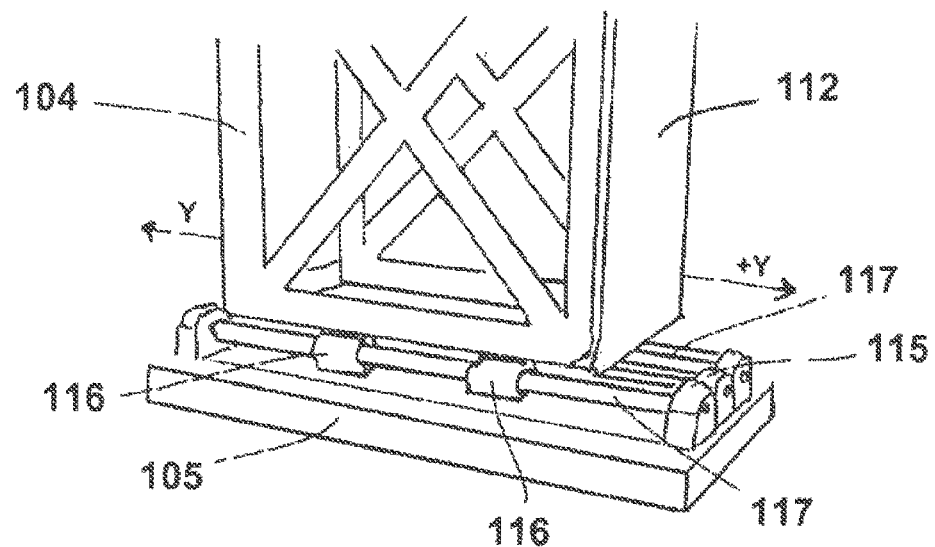
Figure 7:
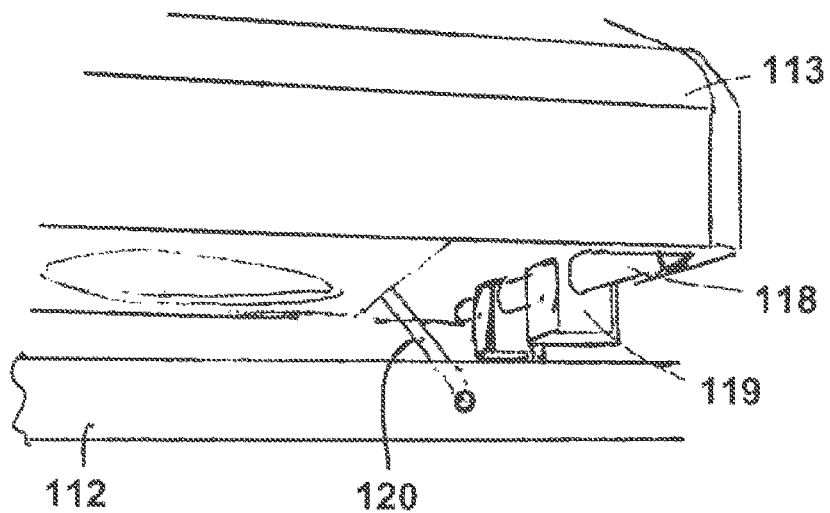
Figure 8:
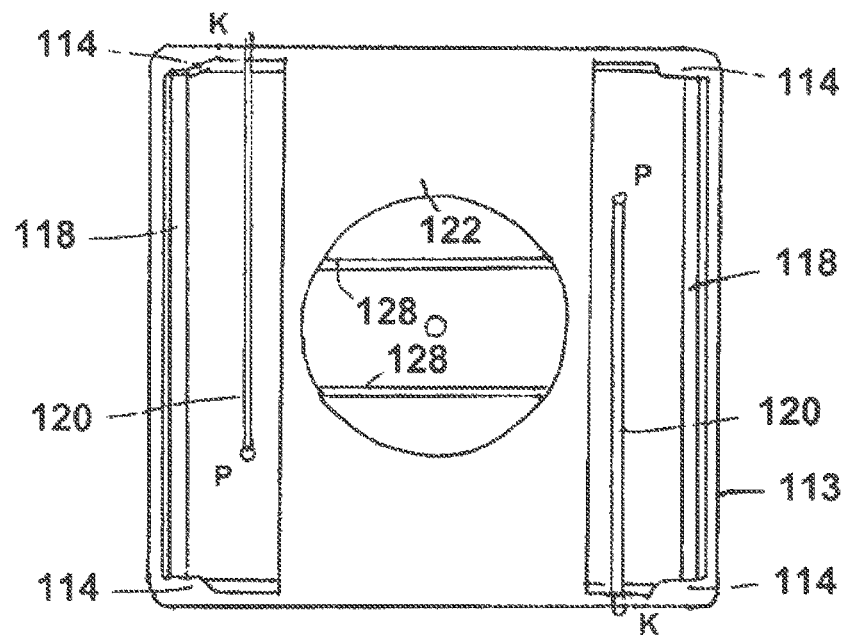
Figure 9:
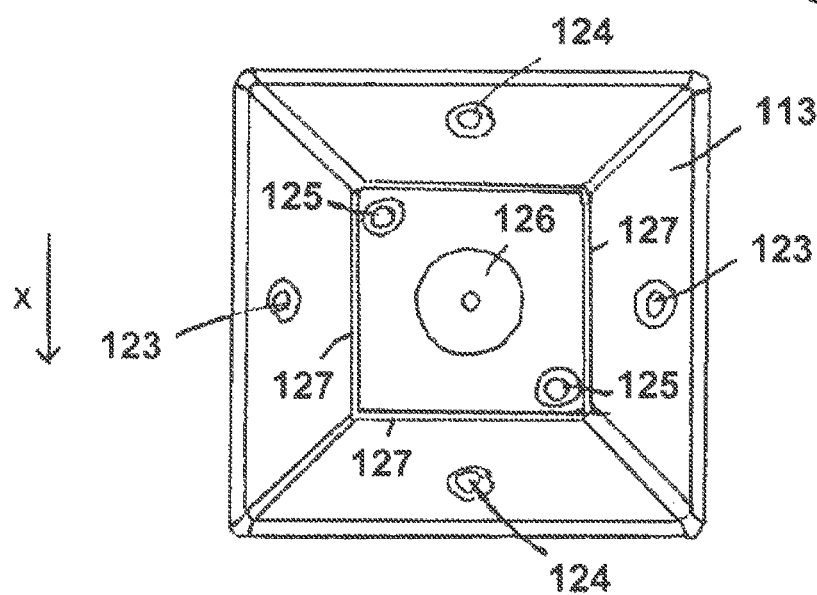
Figure 10:
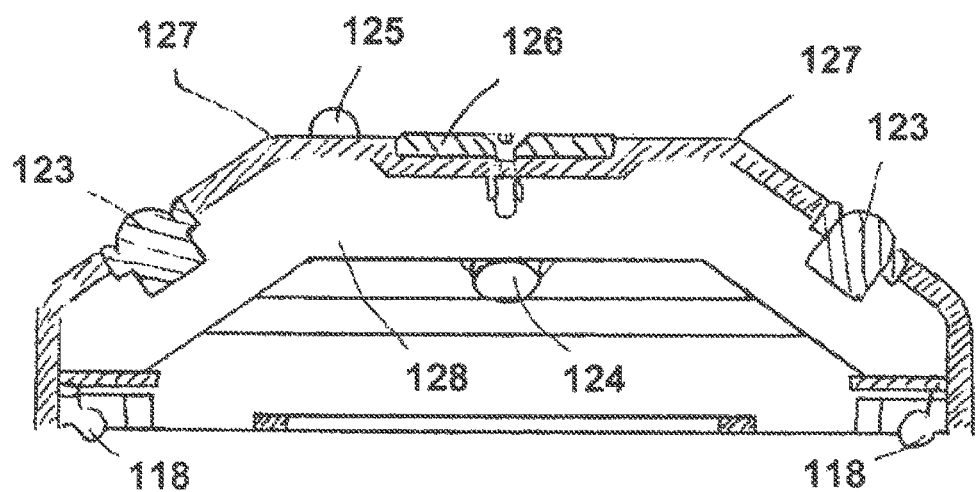
Figure 11:
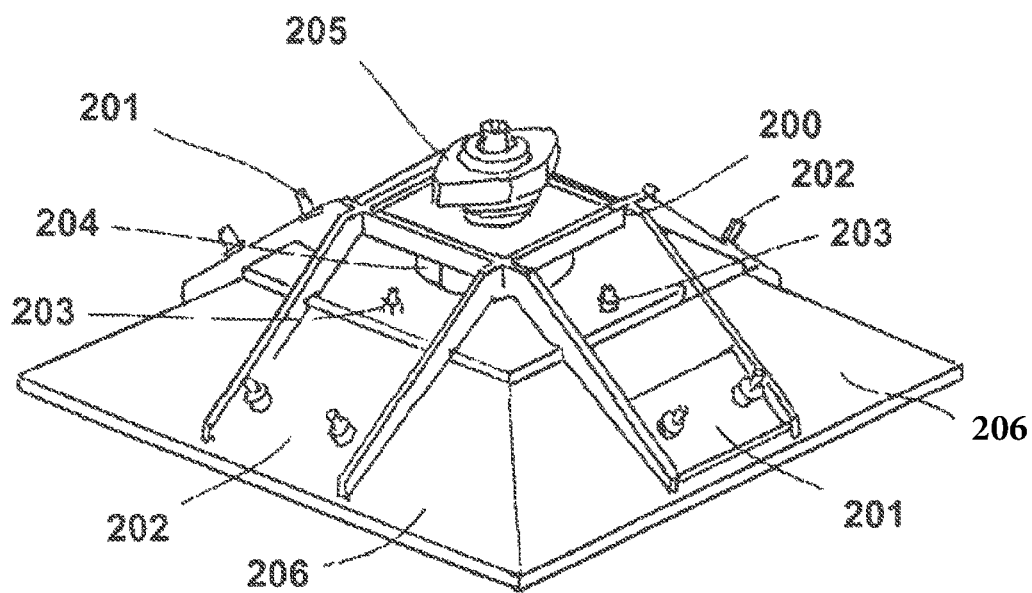
Figure 12:
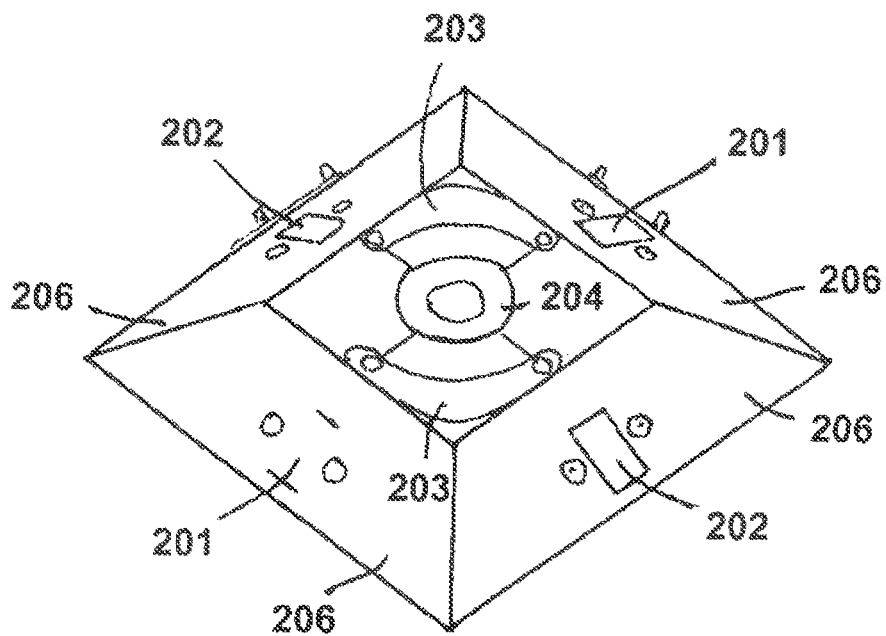
Figure 13:
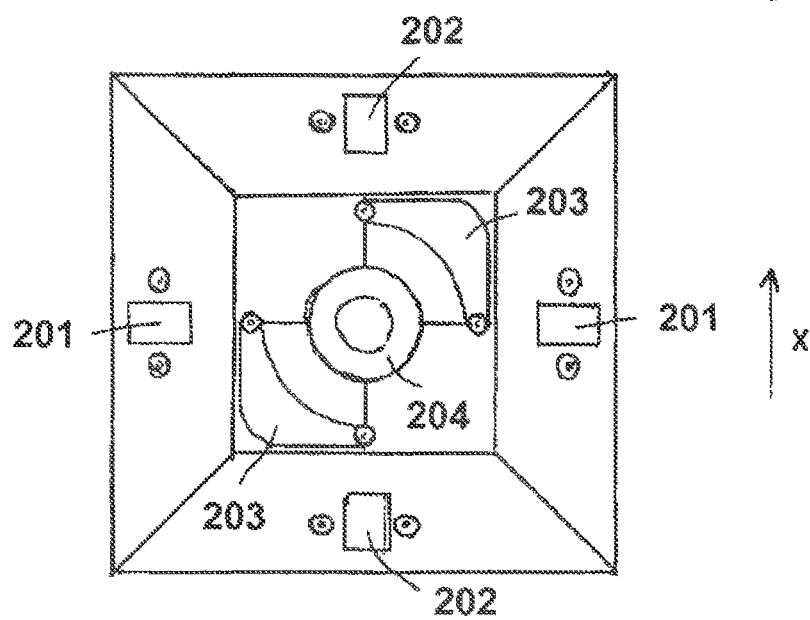
Figure 14:
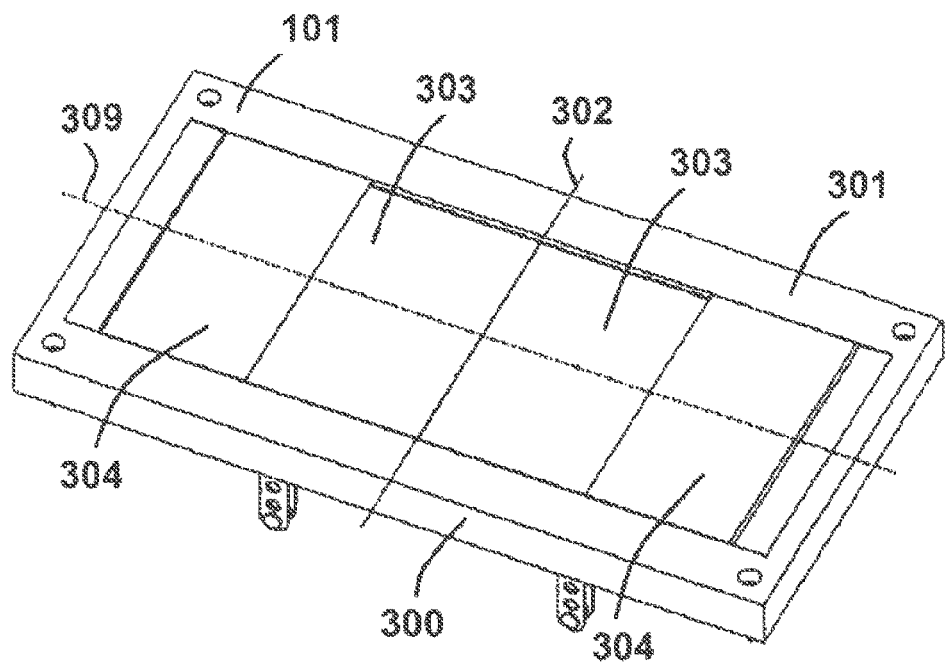
Figure 15:
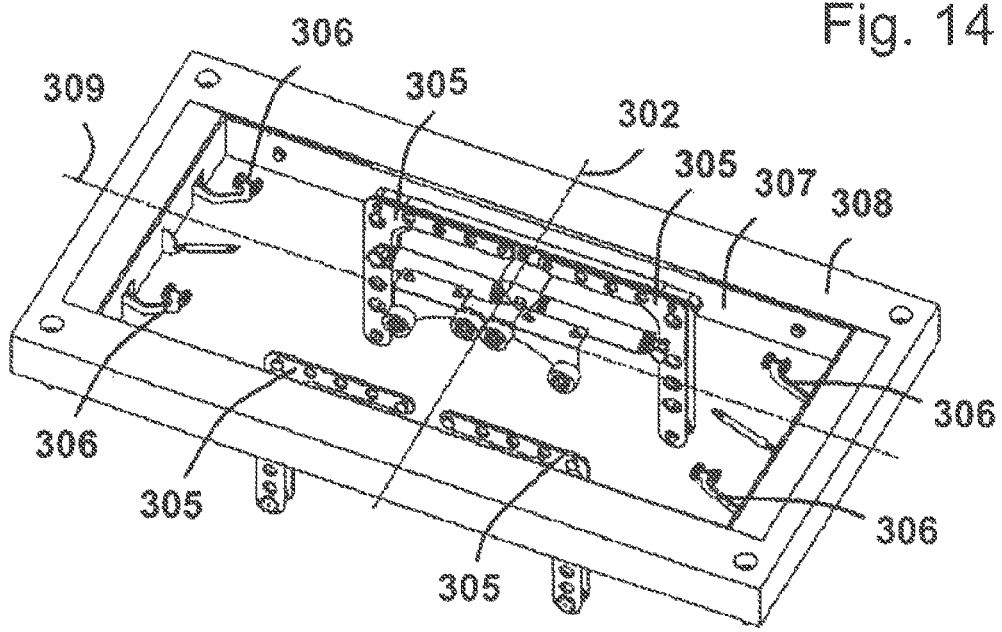
Figure 16:
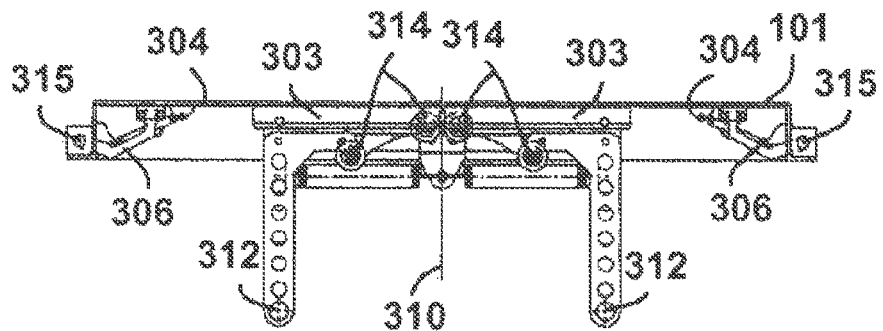
Figure 17:
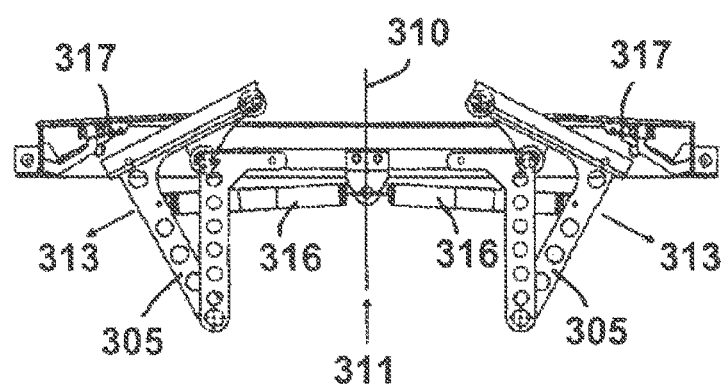
Figure 18:
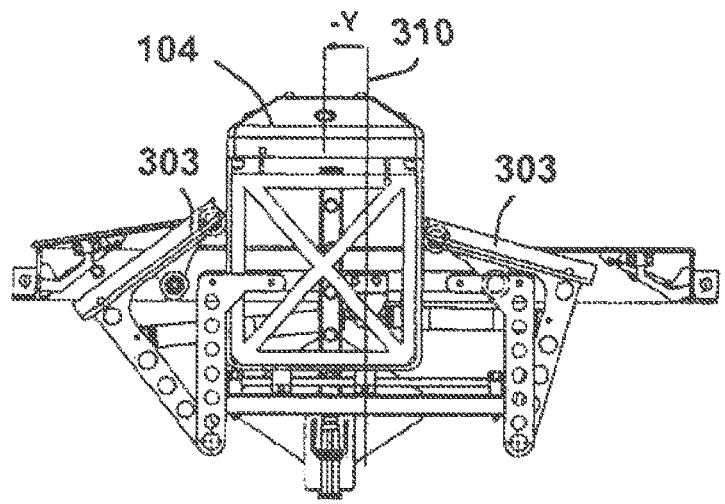
Figure 19:
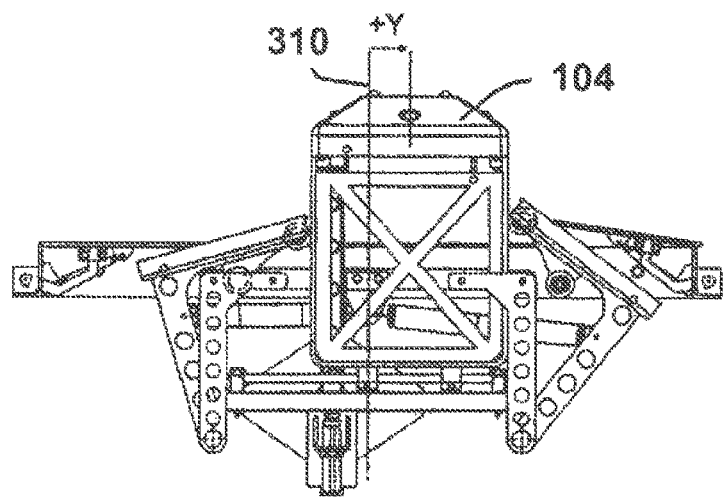
Figure 20:
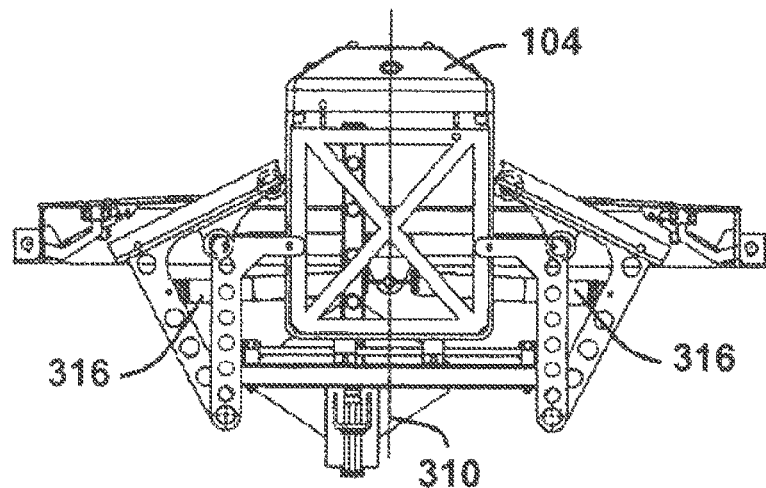
Figure 21:
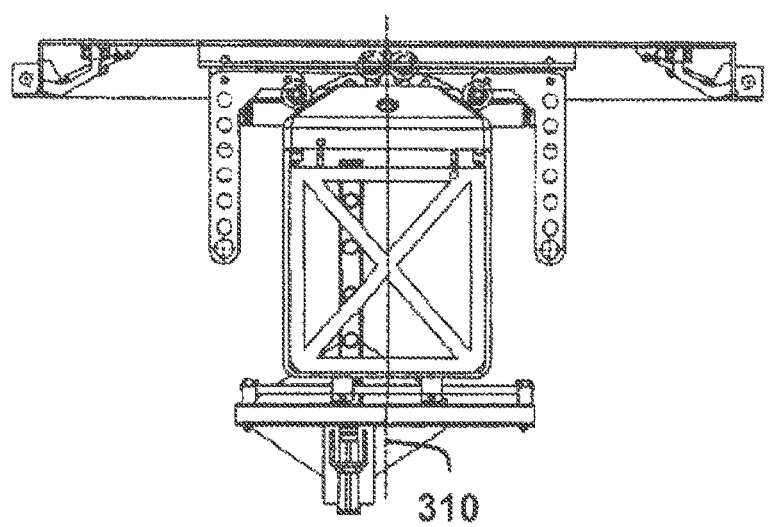
Figure 22:
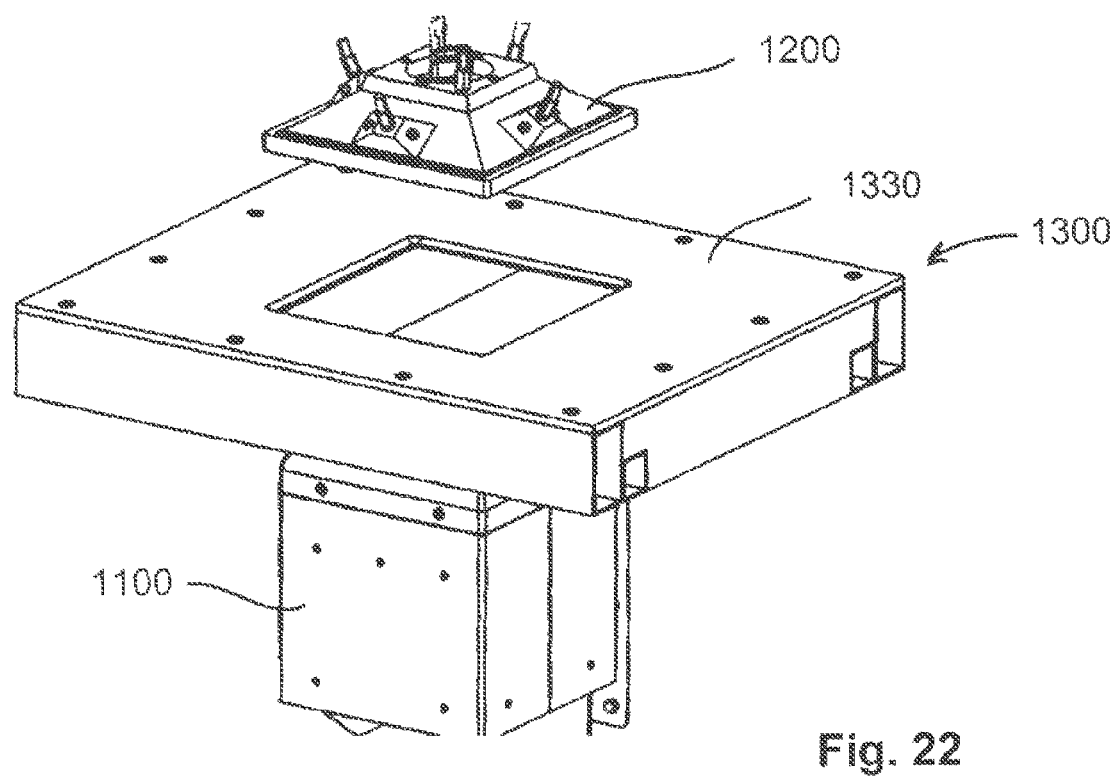
Figure 23:
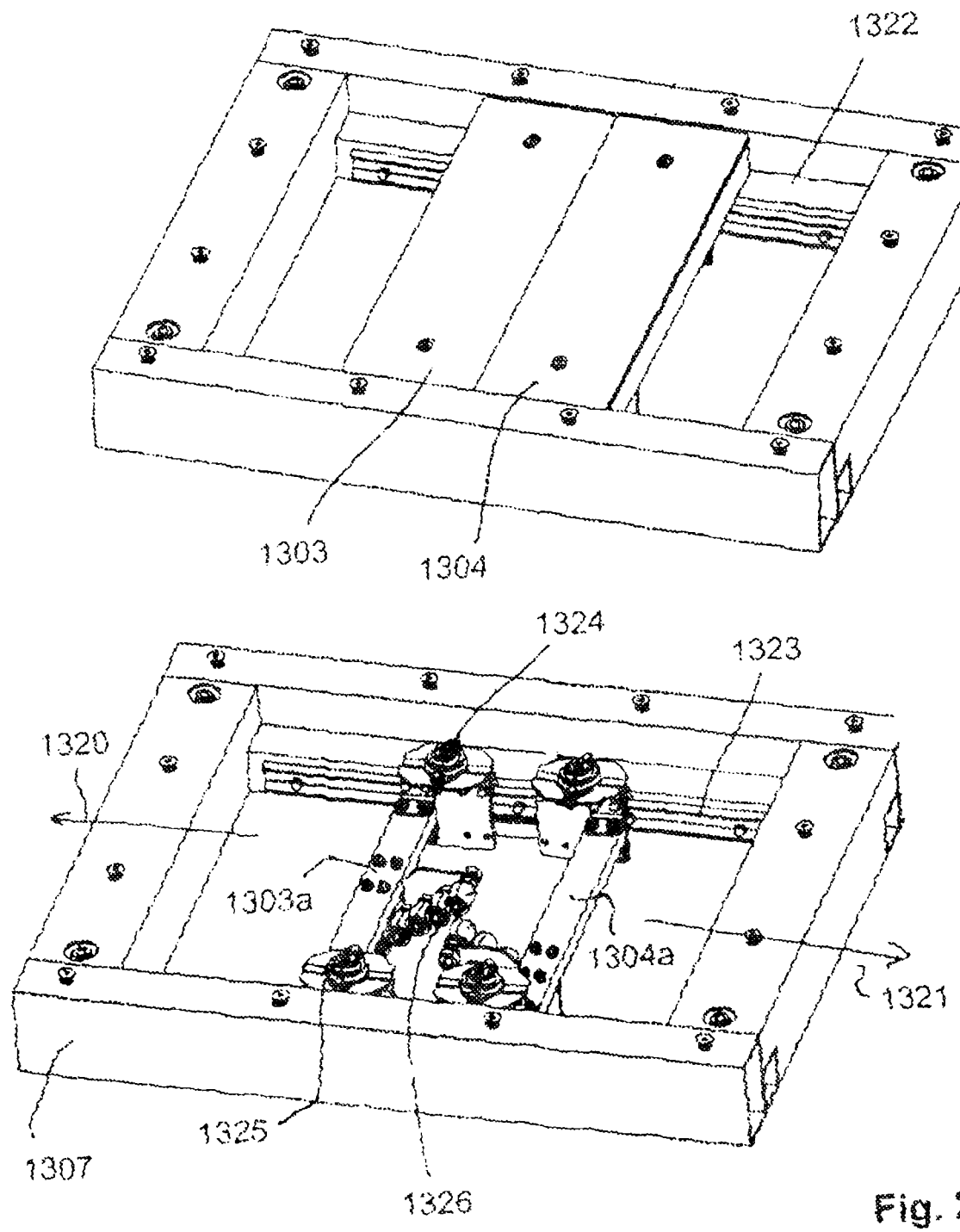
Figure 27:
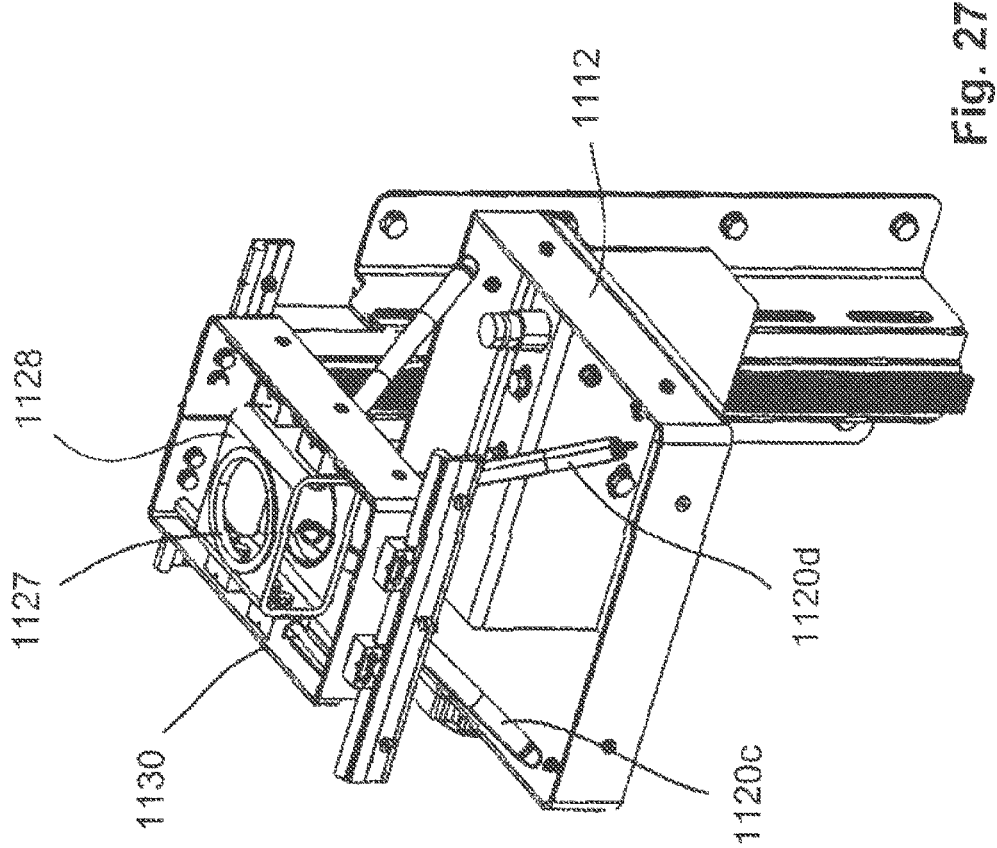
Figure 26:
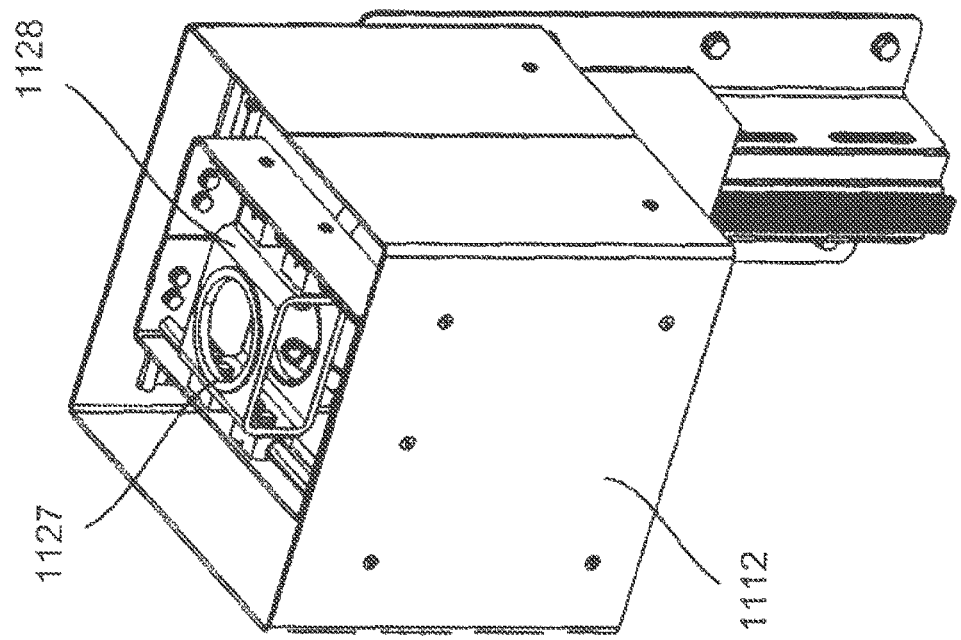
Figure 28:
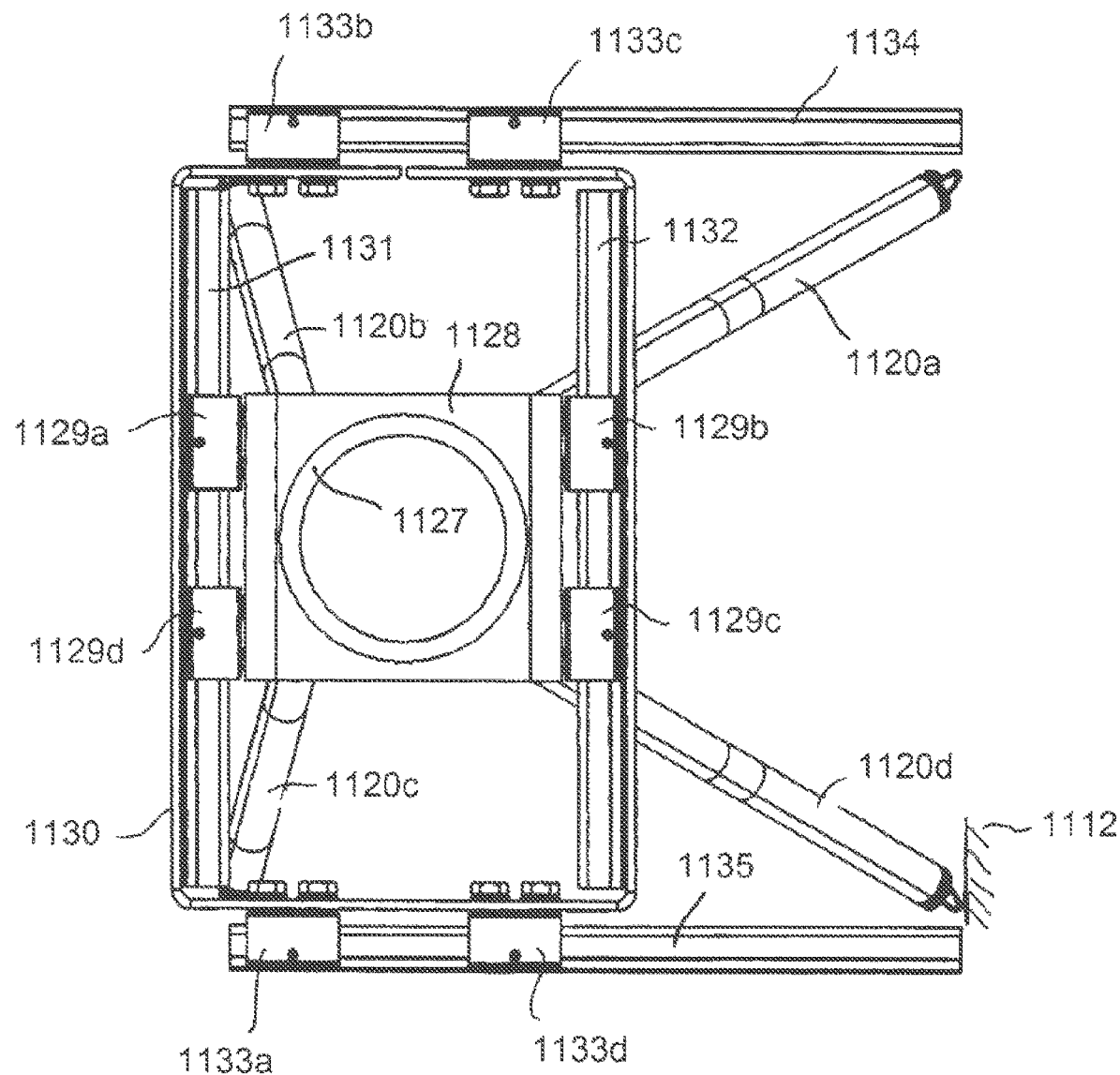
Figure 29:
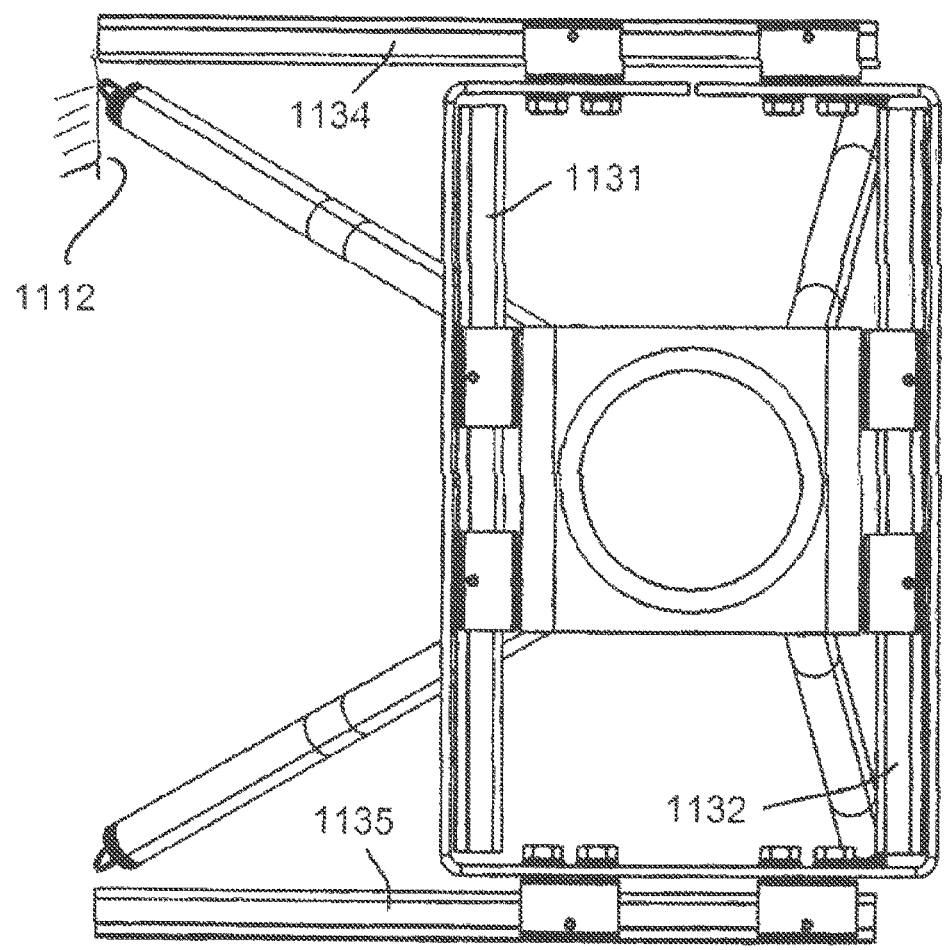
Figure 30:
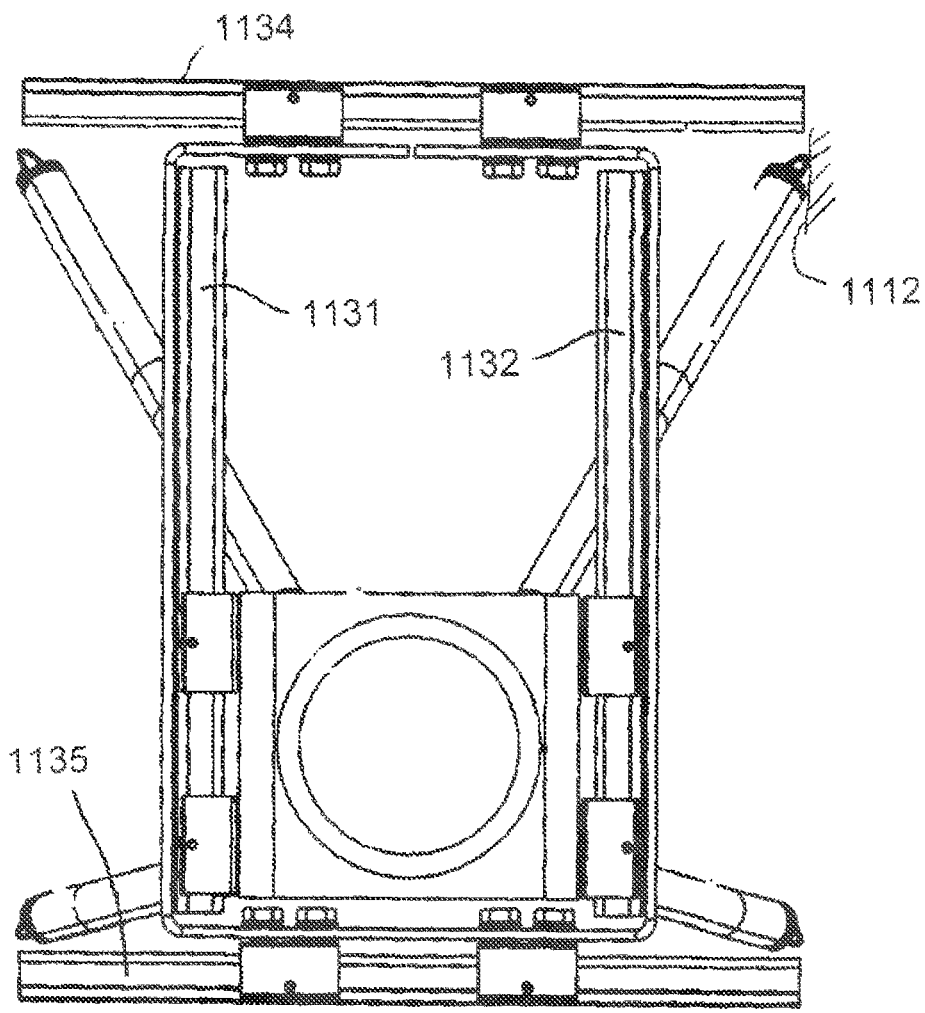
Figure 31:
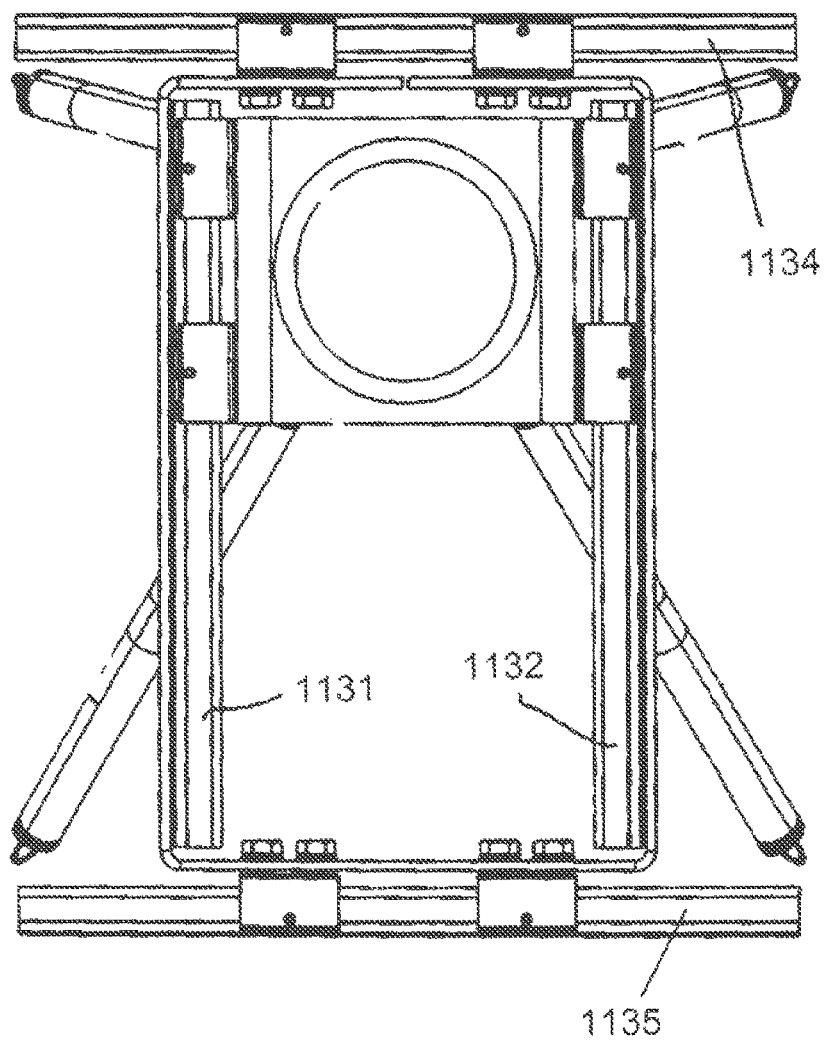
Figure 32:
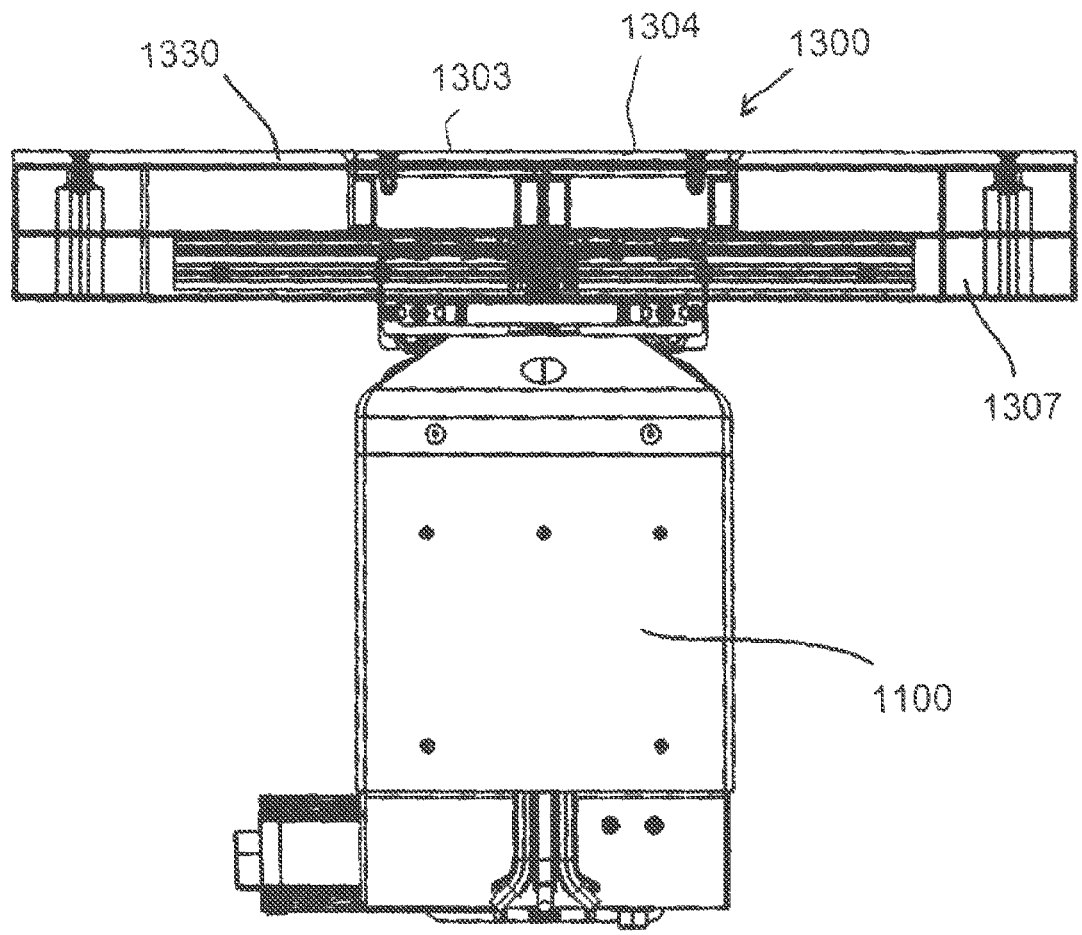
Figure 33:
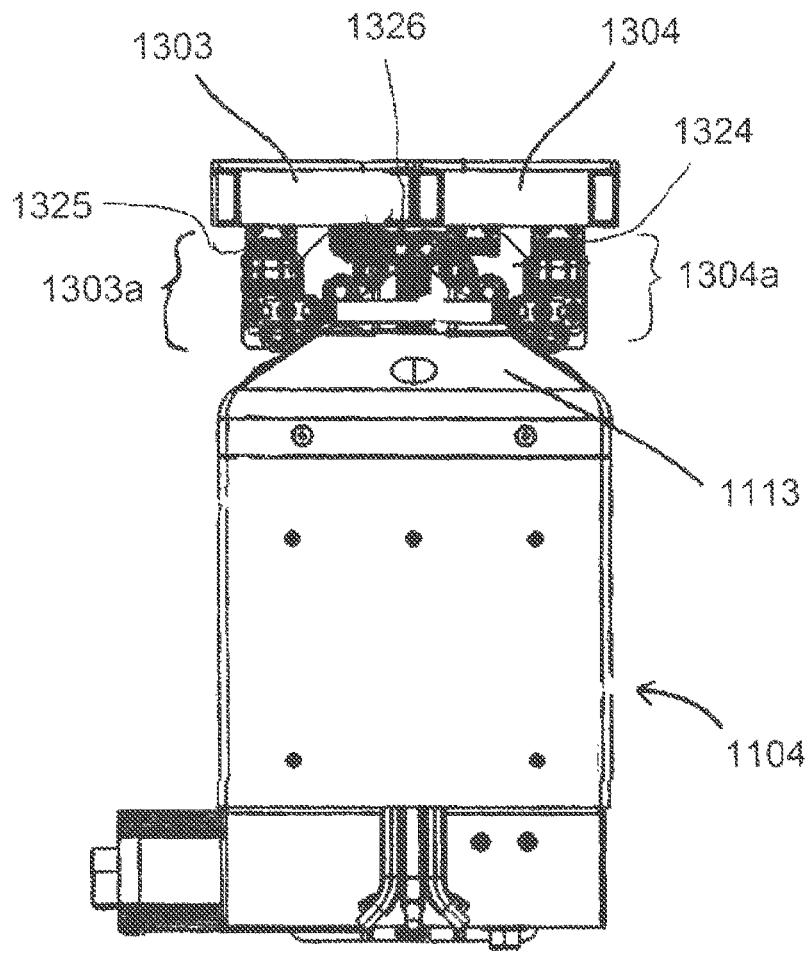
Figure 34:
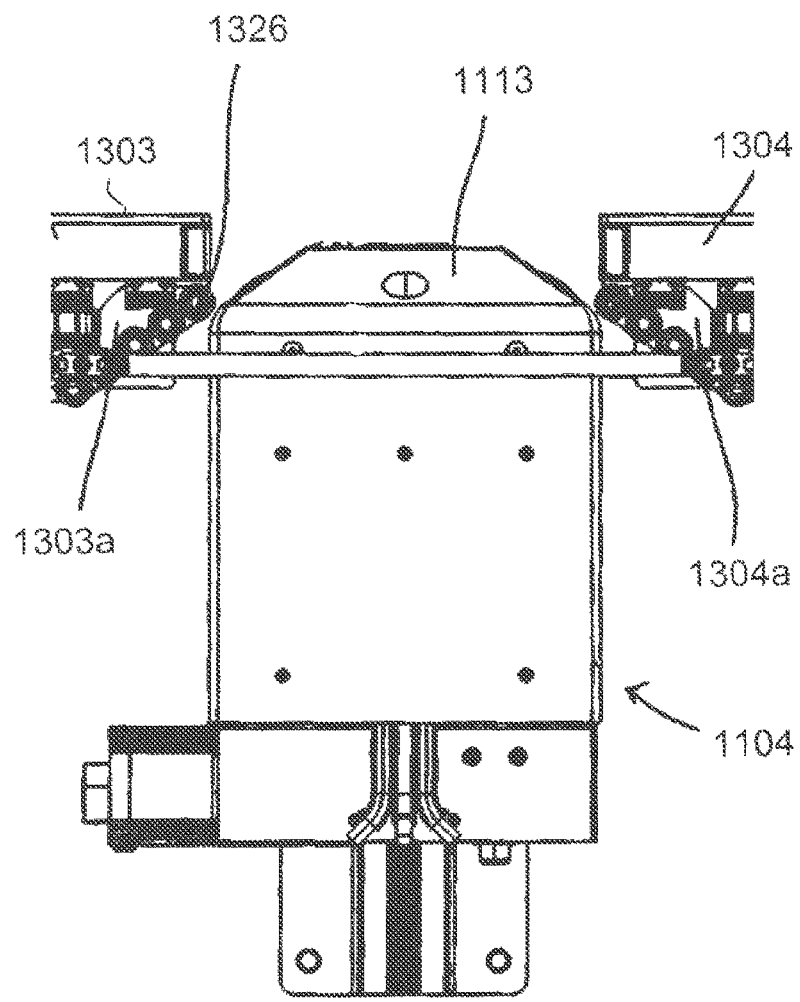
FIG. 34 shows an intermediate position in which the charging contact element carrier 1104 has already passed a little between the covering element carriers 1303*a*, 1304*a* and has pushed these laterally away from one another. The inclined surfaces of the charging contact element carrier head 1113 have come into contact with a plurality of rollers at the same time.
Figure 35:
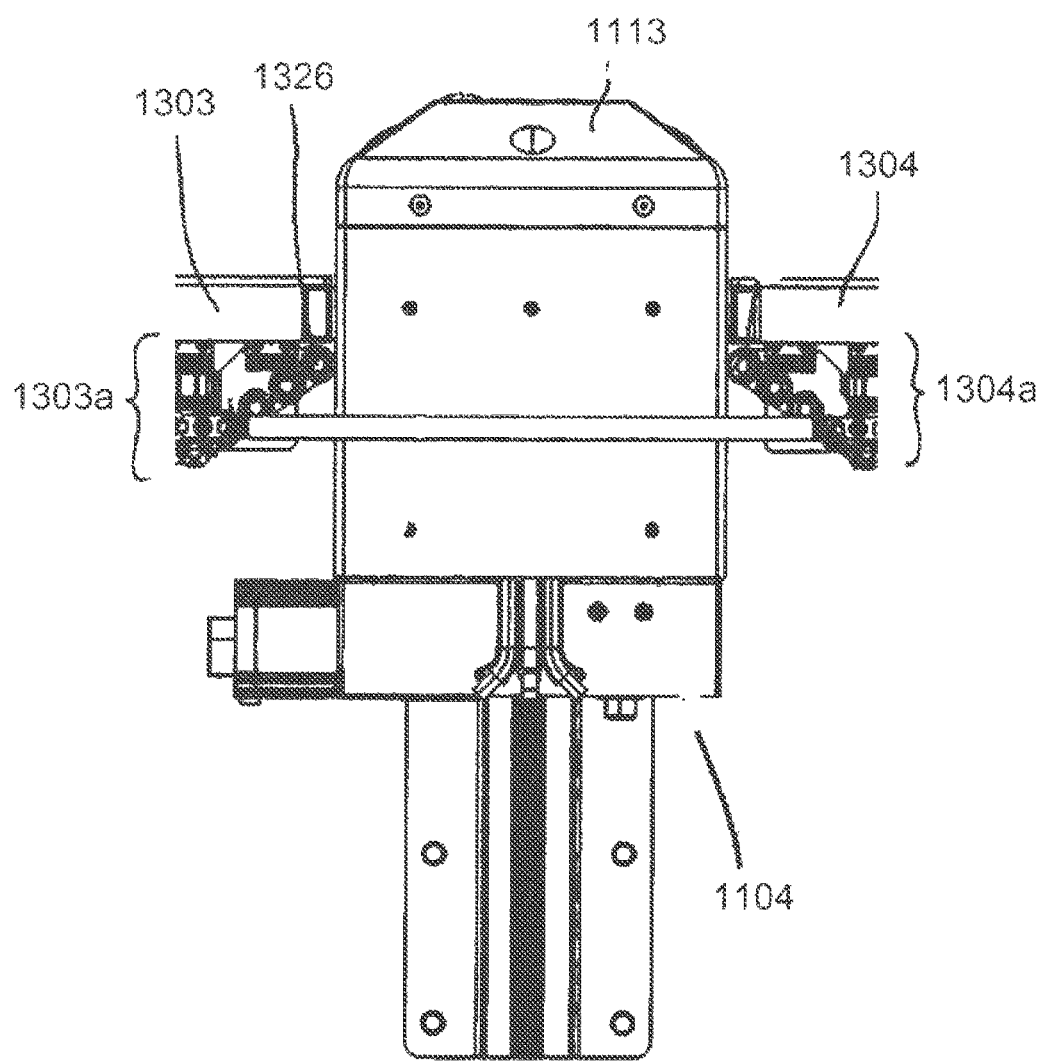
FIG. 35 shows the position in which the charging contact element carrier 1104 has moved further upwards vertically between the covering element carriers 1303*a*, 1304*a*, and the charging contact element carrier is just about to come into contact with a contact apparatus (not shown) of a motor vehicle.

A great advantage of the construction described here with laterally horizontally displaceable covering element carriers and covering elements lies in the fact that, for the function during charging of a battery of a motor vehicle, only a minimum ground clearance of the vehicle is necessary, because the covering elements do not rise above the roadway level.

The following aspects are also worthy of protection in principle, individually or in combination with one another or in combination with the claims:

Aspect 1: A roadway covering for a contact system for electrically driven vehicles, wherein these vehicles comprise at least one energy store, wherein the road covering is arranged in an indentation beneath an upper edge of the roadway, wherein the roadway covering is connected to a shaft element by a connection frame, wherein the roadway covering comprises one or more auxiliary flaps, which are connected to the connection frame in a rotatably mounted manner, wherein the roadway covering comprises one or more main flaps, which are rotatably mounted by means of a lever construction connected to the connection frame, wherein main flaps and auxiliary flaps in the closed state are mechanically supported by the connection frame, characterized in that the main flaps are arranged relative to the charging contact element carrier of the charging contact unit in such a way that, during the vertical upward movement of the charging contact element carrier, said main flaps are deflected by means of the lever construction, and therefore it is possible for the charging contact element carrier to be deployed from the roadway surface as far as the point of contact with the contact apparatus.

Aspect 2: The roadway covering contains at least one main flap, which is mounted rotatably by means of a lever structure and is reversibly adjustable by means of a spring, wherein the lever structure is connected to the connection frame and the main flaps are mounted mechanically by the connection frame in the closed state.

Aspect 3: The roadway covering in the closed state can be traveled over by heavy vehicles.

Aspect 4: Roadway covering: The flap mechanism (main flaps) is designed such that the charging contact unit, when returning to the safe plant condition, is returned automatically to its starting position (centering).

Aspect 5: The opening of the main flap(s) likewise leads to the opening of the auxiliaries flap(s).

Aspect 6: The roadway covering can contain an apparatus, for example an electromagnet, by means of which the flap mechanism can be secured against unintentional opening.

Aspect 7: The roadway covering can contain a measuring device, for example a sensor, with the aid of which the authorization and/or the correct position of the vehicle to be charged with regard to an observance of the tolerable positioning accuracy can be checked.

Aspect 8: In the shaft element, to which the roadway covering is connected, an apparatus, for example a warm-air heating system, can be provided in order to protect the shaft covering and the charging contact unit against ambient influences that are harmful to function, in particular snow and ice.

Aspect 9: The roadway covering can contain an actuator (electrical, pneumatic, hydraulic) by means of which the roadway covering can be opened and closed.

Aspect 10: A charging contact unit for a contact system for electrically driven vehicles, wherein these vehicles have at least one energy store, wherein the charging contact unit is used to form an electrically conductive connection between a vehicle having a contact apparatus and a stationary charging station, wherein the contact apparatus is arranged on a vehicle, wherein the charging contact unit comprises a charging contact element carrier, wherein the contact apparatus can be contacted with the charging contact unit, wherein the charging contact unit comprises a lifting mechanism, wherein the charging contact element carrier can be positioned relative to the contact apparatus by means of the positioning device, wherein the charging contact element carrier comprises charging contact elements, wherein the charging contact elements can be contacted with contact elements of the contact apparatus, in each case so as to form contact pairs, characterized in that the charging contact elements are arranged on the charging contact element carrier relative to the contact elements such that, when the charging contact unit and contact device are brought together, a defined order in the forming of contact pairs is maintained.

Aspect 11: The charging contact unit can be arranged on the vehicle floor (inverted).

Aspect 12: The charging contact unit includes a charging contact element carrier which is formed from an electrically insulating material.

Aspect 13: The charging contact unit includes a combined, passive transverse and longitudinal guidance (plain bearing with spring elements the longitudinal guidance, plain bearing without spring elements the transverse guidance; more complex mechanical or actuator-based solutions for the compensation of positioning tolerances are also conceivable), by means of which the charging contact element carrier is displaceable transversely and longitudinally from its starting position and, in the event of reversal of the action of force by spring restoring forces (of the longitudinal guidance or the flap mechanism), is returned automatically to its starting position.

Aspect 14: The charging contact unit includes a positioning device, for example formed from a gear rack drive with a stepper motor (or hydraulic, pneumatic, electromagnetic, magnetic levitation motor, etc.), by means of which the charging contact unit can be positioned relative to the contact apparatus in the vertical direction.

Aspect 15: The charging contact element carrier of the charging contact unit is provided geometrically in the form of a truncated cone (another geometry is also conceivable: truncated cone, V shape, polygon, etc.), such that, when brought together with the contact apparatus, a guide for the charging contact element carrier is hereby formed and, in the event of complete contact closure, a formfitting connection to the contact apparatus is achieved, and therefore the contact elements and charging contact elements contacted with one another are protected against direct touching (test finger) within the sense of current legal provisions (ECE R100), without the need for an additional barrier element.

Aspect 16: The charging contact element carrier of the charging contact unit includes electrically conductive charging contact elements (DC+, DC−, PE), which are in pin or plate form, for connection to a charging station.

Aspect 17: The charging contact element carrier of the charging contact unit includes a further electrically conductive charging contact element (CP) made of a magnetic material for connection to a charging station, which is arranged in the charging contact element carrier such that this charging contact element, when brought together with the charging contact element carrier comprising the contact apparatus, can be brought into contact with an electromagnet arranged in the contact apparatus.

Aspect 18: The charging contact unit can comprise an apparatus, for example a hydraulic impact damper, by means of which the system mass of the charging contact unit, accelerated by gravity, is damped as it returns to the safe plant condition in the event of impact against the shaft element.

Aspect 19: A contact apparatus for a contact system for electrically driven vehicles, wherein these vehicles comprise at least one energy store, wherein the contact apparatus is used to form an electrically conductive connection between a vehicle comprising the contact apparatus and a stationary charging station, wherein the contact apparatus is arranged on a vehicle, wherein the contact apparatus comprises a structure for receiving contact elements, wherein the contact apparatus can be contacted with the charging contact unit, wherein the charging contact unit comprises a positioning device, wherein the charging contact element carrier can be positioned relative to the contact apparatus by means of the positioning device, wherein the charging contact element carrier comprises charging contact elements, wherein the charging contact elements can be contacted with contact elements of the contact apparatus, in each case so as to form contact pairs, characterized in that the contact elements are arranged on the contact apparatus relative to the charging contact elements such that, when the charging contact unit and contact apparatus are brought together, a defined order in the forming of contact pairs is maintained.

Aspect 20: The contact apparatus can be arranged beneath the upper edge of the roadway (inverted).

Aspect 21: The contact apparatus includes contact guide surfaces in the form of a truncated pyramid (another geometry is also conceivable: truncated cone, V shape, polygon, etc.) formed from an electrically insulating material, which guide surface in the contacted state form a form fit with the charging contact element carrier of the charging contact unit.

Aspect 22: The contact apparatus includes electrically conductive contact elements which are in pin form or are formed as contact plates and are mounted in the contact guide surfaces and are arranged geometrically on the contact guide surfaces such that it is possible for the vehicle that is to be charged to approach with correct polarity from two movement directions of a first spatial direction, for connection to a vehicle energy store.

Aspect 23: The contact apparatus includes a further electrically conductive contact element (CP), which is not arranged in one of the contact guide surfaces and which is formed as an electromagnet, with which a locking, which can be switched on and off, of the contact closure during the charging process and the formation of a sufficiently high contact force between the contact elements and the charging contact elements can be ensured. There is no need for any drive energy in order to return the system to the starting position (safe plant condition) (current supply to the electromagnet is interrupted, return by gravity).

Aspect 24: The contact apparatus includes a further electrically conductive contact element which is not arranged in one of the contact guide surfaces and is arranged geometrically such that an approach from a second spatial direction arranged orthogonally to the first spatial direction, by appropriate arrangement of the contact elements and charging contact elements to form the PE connection, cannot lead to a target current release (prevention of short-circuit in the event of an approach with incorrect polarity).

Aspect 25: The contact guide surfaces of the contact apparatus form a guide for the charging contact element carrier.

Aspect 26: The contact apparatus can comprise protection against ambient influences, in particular dirt, in the form for example of a flap system, which can be embodied with or without separate function actuator (electrical, pneumatic, hydraulic, magnetic, force of gravity and spring force).

Aspect 27: The contact apparatus can contain heating elements, for example in the form of heating strips, in order to ensure that the contact elements remain free from snow and ice.

Aspect 28: In order to increase the transmittable charging current, more than one contact element per formed contact pole, primarily the contact poles for power transmission and for the protective earth (PE), can be contained both in the contact apparatus and in the charging contact unit.

Aspect 29: A contact system with a roadway covering according to any one of aspects 1 to 9, a charging contact unit according to any one of aspects 10 to 18, and a contact apparatus according to any one of aspects 19 to 28.

Aspect 30: A method for forming an electrically conductive connection between a vehicle and a stationary charging station, in particular for a contact system for electrically driven vehicles, wherein these vehicles comprise at least one energy store, with a roadway covering, a charging contact unit and a contact apparatus, wherein the charging contact unit is arranged in a shaft element beneath the roadway covering, wherein the contact apparatus is arranged on a vehicle, wherein the charging contact unit comprises a charging contact element carrier, wherein the contact apparatus can be contacted with the charging contact unit, wherein the charging contact unit or the contact apparatus comprises a positioning device, wherein the charging contact element carrier can be positioned relative to the contact apparatus by means of the positioning device, wherein the charging contact element carrier comprises charging contact elements, wherein the charging contact elements can be contacted with contact elements of the contact apparatus in each case so as to form contact pairs, characterized in that the charging contact unit and the contact apparatus brought together such that a defined order in the forming of contact pairs is maintained.

Aspect 31: Method: A protective earth contact pair is formed first, prior to a power contact pair.

Aspect 32: Method: A power contact pair is formed first, prior to a control conductor contact pair.

Aspect 33: Method: The necessary holding and contact force during the charging process is applied by activation of an electromagnet (frictional engagement), whereby the actuator of the positioning device can be switched off and the system has maximum freedom of movement in the direction of the force of gravity. The current supply to the actuator can be switched off here following evaluation of a current increase at the time of the contact closure.

Aspect 34: Method: parallel linking of the current supply of the electromagnet, which is arranged in the contact apparatus and acts as a control conductor contact, to the protective circuitry of the charging process (closing/opening of the control line on the vehicle).

The invention claimed is:

1. A contact apparatus for charging an energy store of a vehicle using a separate charging station, the contact apparatus comprising:
one or more contact elements; and
one or more contact guide surfaces, corresponding to each of the one or more contact elements;
wherein the contact apparatus is configured to make contact with a charging contact element carrier of a charging contact unit, wherein the one or more contact elements of the contact apparatus are each adapted to form one or more contact pairs with charging contact elements of the charging contact element carrier, wherein the one or more contact elements of the contact apparatus are configured to be arranged such that, when the charging contact unit and contact apparatus are brought together, a defined order of forming the one or more contact pairs is maintained, wherein at least one of the one or more contact elements of the contact apparatus are in pin form or are formed as a contact plate, are mounted in the one or more contact guide surfaces, and are arranged geometrically on the one or more contact guide surfaces to permit the vehicle to approach with a correct polarity to form contact pairs from two movement directions along a first spatial axis with the charging contact unit rotated 180° as viewed from the contact apparatus between the two movement directions, for connection to the energy store.

2. The contact apparatus of claim 1, wherein the one or more contact guide surfaces are shaped as one or more of an inverted truncated pyramid, an inverted truncated cone or a hollow cone, wherein the one or more contact guide surfaces are made of an electrically insulating material, which when in a contacted state, form a positive connection with the charging contact element carrier.

3. The contact apparatus of claim 1, wherein the at least one of the one or more contact elements mounted in the one or more contact guide surfaces are spring-loaded to maintain the defined order of forming the one or more contact pairs.

4. The contact apparatus of claim 2 further comprising:
a holding apparatus that is not arranged in one of the one or more contact guide surfaces and is configured for an electromagnetic coupling in which a locking of a contact closure during a charging process can be switched on and off, and a contact force between the one or more contact elements of the contact apparatus and the one or more charging contact elements of the charging contact element carrier is created.

5. The contact apparatus of claim 4, wherein the holding apparatus is structurally combined in at least one of the one or more contact elements of the contact apparatus.

6. The contact apparatus of claim 1, further comprising:
a ball-joint type rotatable elastic bearing for attachment to the vehicle.

7. The contact apparatus of claim 1, further comprising:
a flap system to protect against an ambient influence.

8. The contact apparatus of claim 7, wherein the ambient influence includes dirt.

9. The contact apparatus of claim 1, further comprising:
a heating element, configured to keep the one or more contact elements of the contact apparatus free from snow and ice.

10. The contact apparatus of claim 9, wherein the heating element includes a heating strip.

11. The contact apparatus of claim 1, further comprising:
a second contact element of the contact apparatus and wherein two or more contact elements of the contact apparatus are included per contact pole for power transmission.

12. A charging contact unit for charging an energy store of a vehicle using a separate charging station, the charging contact unit comprising:
a charging contact element carrier, wherein the charging contact element carrier is configured to contact a contact apparatus arranged on the vehicle, the contact apparatus forming an electrically conductive connection between the vehicle and the charging station, wherein one or more charging contact elements of the charging contact element carrier are each configured to form one or more contact pairs with one or more contact elements of the contact apparatus, and wherein the one or more charging contact elements of the charging contact element carrier are configured to be arranged such that, when the charging contact unit and contact apparatus are brought together, a defined order for forming the one or more contact pairs is maintained, wherein the one or more charging contact elements of the charging contact element carrier are arranged geometrically on the charging contact element carrier to permit the vehicle to approach with a correct polarity to form contact pairs from two movement directions along a first spatial axis with the contact apparatus rotated 180° as viewed from the charging contact unit between the two movement directions, for connection to the energy store.

13. The charging contact unit of claim 12, further comprising:
a charging contact element carrier head having a shape of a truncated pyramid, a truncated cone, or a cone, wherein the charging contact element carrier head is made of an electrically insulating material, which when in a contacted state, forms a positive connection with the contact apparatus.

14. The charging contact unit of claim 12, further comprising:
a combined passive transverse and longitudinal guidance which is designed such that the charging contact element carrier is displaceable transversely and longitudinally from a starting position when a force is applied and is automatically returned to the starting position when the force is reversed.

15. The charging contact unit of claim 12, further comprising:
a positioning device configured to cause the charging contact element carrier to be positioned relative to the contact apparatus.

16. The charging contact unit of claim 13, wherein the one or more charging contact elements of the contact apparatus are in pin form or are formed as a contact plate and are spring-loaded to maintain the defined order of forming the one or more contact pairs.

17. The charging contact unit of claim 13, further comprising:
a holding apparatus configured for electromagnetic coupling in which a locking of a contact closure during a charging process can be switched on and off, and a contact force between the one or more contact elements of the contact apparatus and the one or more charging contact elements of the charging contact element carrier is created.

18. The charging contact unit of claim 17, wherein the holding apparatus is structurally combined in an electrically conductive charging contact element.

19. A contact system comprising:
a contact apparatus; and
a charging contact unit;
wherein the contact apparatus includes one or more contact guide surfaces shaped as at least one of an inverted truncated pyramid, an inverted truncated cone, or a hollow cone, wherein the charging contact unit includes a charging contact element carrier head complementary thereto shaped as a truncated pyramid, a truncated cone, or a cone formed from an electrically insulating material, such that the contact apparatus and the charging contact element carrier head form a positive connection in a contacted state, wherein the contact apparatus comprises a holding apparatus that is not arranged in one of the contact guide surfaces and is configured for electromagnetic coupling, wherein the charging contact unit comprises a second holding apparatus configured for electromagnetic coupling, such that a locking of a contact closure during a charging process can be switched on and off, and a contact force between one or more contact elements of the contact apparatus and one or more charging contact elements of the charging contact carrier head is created, wherein an offset between the contact apparatus and the charging contact unit is compensated for by the positive connection between the contact apparatus and the charging contact element carrier head and by the contact force of the second holding apparatus, wherein at least one of the one or more contact elements of the contact apparatus are arranged geometrically on the one or more contact guide surfaces, and wherein the one or more charging contact elements of the charging contact element carrier are arranged geometrically on the charging contact element carrier to permit a vehicle to approach with a correct polarity to form contact pairs from two movement directions along a first spatial axis with the charging contact unit rotated 180° as viewed from the contact apparatus between the two movement directions, for connection to an energy store.

* * * * *